US012118811B2

(12) United States Patent
Kwak et al.

(10) Patent No.: US 12,118,811 B2
(45) Date of Patent: Oct. 15, 2024

(54) ELECTRONIC DEVICE AND METHOD FOR SHAPE RECOGNITION BASED ON STROKE ANALYSIS IN ELECTRONIC DEVICE

(71) Applicant: Samsung Electronics Co., Ltd., Gyeonggi-do (KR)

(72) Inventors: Taewon Kwak, Gyeonggi-do (KR); Jinsu Shin, Gyeonggi-do (KR); Jiwon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/586,965

(22) Filed: Jan. 28, 2022

(65) Prior Publication Data

US 2022/0237936 A1   Jul. 28, 2022

Related U.S. Application Data

(63) Continuation of application No. PCT/KR2022/001390, filed on Jan. 26, 2022.

(30) Foreign Application Priority Data

Jan. 28, 2021  (KR) .................. 10-2021-0012683

(51) Int. Cl.
*G06V 30/32* (2022.01)
*G06F 3/04883* (2022.01)

(52) U.S. Cl.
CPC ........ *G06V 30/347* (2022.01); *G06F 3/04883* (2013.01)

(58) Field of Classification Search
CPC .. G06F 3/0237; G06F 3/04883; G06V 30/347
See application file for complete search history.

(56) References Cited

U.S. PATENT DOCUMENTS

| 5,287,417 A | * | 2/1994 | Eller ...................... G06V 30/32 |
| | | | 715/764 |
| 5,491,758 A | | 2/1996 | Bellegarda et al. |

(Continued)

FOREIGN PATENT DOCUMENTS

| CN | 100587660 C | * | 2/2010 |
| CN | 101685497 B | * | 10/2011 |

(Continued)

OTHER PUBLICATIONS

International Search Report dated May 9, 2022.

*Primary Examiner* — Tan H Tran
(74) *Attorney, Agent, or Firm* — Cha & Reiter, LLC

(57) ABSTRACT

According to an embodiment, an electronic device may include a display, a memory, and at least one processor operatively coupled to the display and the memory. The memory stores instructions that are configured to, when executed, enable the at least one processor to display first stroke data of a first stroke trajectory, based on an input of a first touch-move after a first touch-down on the display, perform shape recognition on the first stroke trajectory, based on a size of the first stroke trajectory and a distance between a stroke start point of the first stroke trajectory and another point on the first stroke trajectory, convert the first stroke data into second stroke data corresponding to a recognized shape form, based on the shape recognition, and display the second stroke data on the display. Various other embodiments may be possible.

17 Claims, 20 Drawing Sheets

(56) References Cited

U.S. PATENT DOCUMENTS

| | | | |
|---|---|---|---|
| 6,269,260 B1* | 7/2001 | Shin | H04M 1/2748 |
| | | | 341/26 |
| 2004/0165777 A1 | 8/2004 | Lossev et al. | |
| 2006/0126936 A1* | 6/2006 | Bhaskarabhatla | |
| | | | G06V 30/1423 |
| | | | 382/187 |
| 2007/0025618 A1* | 2/2007 | Lin | G06V 30/347 |
| | | | 382/186 |
| 2008/0260252 A1* | 10/2008 | Borgaonkar | G06V 30/1423 |
| | | | 382/189 |
| 2010/0171754 A1* | 7/2010 | Hatfield | G06V 30/347 |
| | | | 345/441 |
| 2014/0189609 A1 | 7/2014 | Lee | |
| 2014/0363082 A1 | 12/2014 | Dixon et al. | |
| 2015/0154176 A1* | 6/2015 | Tasaki | G06F 40/274 |
| | | | 715/261 |
| 2015/0242114 A1* | 8/2015 | Hirabayashi | G06V 30/1423 |
| | | | 345/156 |
| 2016/0070441 A1* | 3/2016 | Paek | G06F 3/0485 |
| | | | 715/773 |
| 2016/0124630 A1* | 5/2016 | Qian | G06F 3/018 |
| | | | 345/173 |
| 2016/0147436 A1* | 5/2016 | Tsutsui | G06F 3/04883 |
| | | | 715/268 |
| 2016/0154997 A1* | 6/2016 | Kim | G06F 3/04883 |
| | | | 382/189 |
| 2017/0109578 A1 | 4/2017 | Bednarowicz et al. | |
| 2017/0249293 A1 | 8/2017 | Couelier | |
| 2018/0095653 A1* | 4/2018 | Hasek | G06F 3/04883 |
| 2018/0129367 A1* | 5/2018 | Hatfield | G06F 3/04817 |
| 2021/0042027 A1* | 2/2021 | Lee | G06F 40/171 |
| 2021/0216760 A1* | 7/2021 | Howell | G06V 30/36 |
| 2021/0294441 A1 | 9/2021 | Sung et al. | |

FOREIGN PATENT DOCUMENTS

| | | | | |
|---|---|---|---|---|
| CN | 103294257 B | * | 9/2017 | G06F 3/04883 |
| EP | 2626813 A2 | * | 8/2013 | G06F 3/04883 |
| EP | 3722995 A1 | * | 10/2020 | G06F 3/03545 |
| JP | 6-150064 A | | 5/1994 | |
| JP | 8-180135 A | | 7/1996 | |
| JP | 2007-188159 A | | 7/2007 | |
| JP | 2012-63938 A | | 3/2012 | |
| JP | 2020-77409 A | | 5/2020 | |
| KR | 10-2014-0085942 A | | 7/2014 | |
| KR | 10-1682162 B1 | | 11/2016 | |
| KR | 10-2020-0017157 A | | 2/2020 | |

\* cited by examiner

| FIRST STROKE DATA | SECOND STROKE DATA |
|---|---|
|  |  |
|  |  |

ELECTRONIC DEVICE AND METHOD FOR SHAPE RECOGNITION BASED ON STROKE ANALYSIS IN ELECTRONIC DEVICE

CROSS-REFERENCE TO RELATED APPLICATION(S)

This application is a Continuation of International Application No. PCT/KR2022/001390, which was filed on Jan. 26, 2022, and claims priority to Korean Patent Application No. 10-2021-0012683, filed on Jan. 28, 2021, in the Korean Intellectual Property Office, the disclosure of which are incorporated by reference herein their entirety.

BACKGROUND

Technical Field

One or more embodiments disclosed herein generally relate to an electronic device and a method for recognizing a shape based on a stroke in the electronic device.

Description of Related Art

Portable electronic devices, such as smartphones, tablet PCs, or wearable devices, have become increasingly common recently, and users may take advantage of various functions of the electronic devices by using various input means, for example, not only fingers, but also input tools such as electronic pens (for example, stylus pens).

The stylus pen enables more precise touch inputs than fingers, and thus can be more useful in applications requiring writing inputs such as memos or sketches. In addition, writing inputs based on content composition have a high degree of freedom, is more intuitive, and enables fast inputs, and the utility thereof is substantially increasing due to improvement in character recognition technologies for written content.

By using a stylus pen, a user may input written characters or drawings on the screen of an electronic device, as if writing on a notebook. In addition, a notebook application enables the user not only to make drawings, but also to output drawing marks while variously changing pen drawing options such as pen thickness, brush, and color. As such, the user may provide inputs to the electronic device conveniently and intuitively by using the stylus pen.

SUMMARY

According to the conventional shape recognition function in conventional electronic devices, after a shape recognition function menu is selected, the conventional electronic device may receive a writing input which will be subjected to shape recognition, and may perform shape recognition with regard to the received writing input.

According to such a conventional shape recognition function, shape recognition is not performed naturally (or automatically) while the user enters writing inputs, but a separate menu has to be selected (or mode has to be switched) to deploy the shape recognition function, and writing inputs for the shape recognition function have to be separately made, which is inconvenient to the user.

Furthermore, when shape recognition succeeds for a particular writing input, the conventional shape recognition function displays the shape with a designated thickness, brush, or color regardless of the pen drawing option such as the thickness, brush, or color of the pen currently used by the user for writing, and may fail to express the recognized shape with the drawing option of the current writing of the user According to an embodiment, an electronic device may include a display, a memory, and at least one processor operatively coupled to the display and the memory, where the memory stores instructions that are configured to, when executed, enable the at least one processor to display first stroke data of a first stroke trajectory, based on an input of a first touch-move after a first touch-down on the display, perform shape recognition on the first stroke trajectory, based on a size of the first stroke trajectory and a distance between a stroke start point of the first stroke trajectory and another point on the first stroke trajectory, convert the first stroke data into second stroke data corresponding to a recognized shape form, based on the shape recognition, and display the second stroke data on the display.

According to an embodiment, a method for shape recognition based on stroke analysis in an electronic device may include, based on an input of a first touch-move after a first touch-down on a display of the electronic device, displaying first stroke data of a first stroke trajectory on the display, performing shape recognition on the first stroke trajectory, based on a size of the first stroke trajectory and a distance between a stroke start point of the first stroke trajectory and another point on the first stroke trajectory, converting the first stroke data into second stroke data corresponding to a recognized shape form, based on the shape recognition, and displaying the second stroke data on the display.

According to an embodiment, in connection with a non-transitory storage medium storing commands configured to, when executed by at least one processor, cause the at least one processor to perform at least one operation, the at least one operation may include, based on an input of a first touch-move after a first touch-down on a display of an electronic device, displaying first stroke data of a first stroke trajectory on the display, performing shape recognition on the first stroke trajectory, based on a size of the first stroke trajectory and a distance between a stroke start point of the first stroke trajectory and another point on the first stroke trajectory, converting the first stroke data into second stroke data corresponding to a recognized shape form, based on the shape recognition, and displaying the second stroke data on the display.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

In relation to the description of drawings, the same or similar reference numerals may be used for the same or similar components.

DETAILED DESCRIPTION

Figure 1:
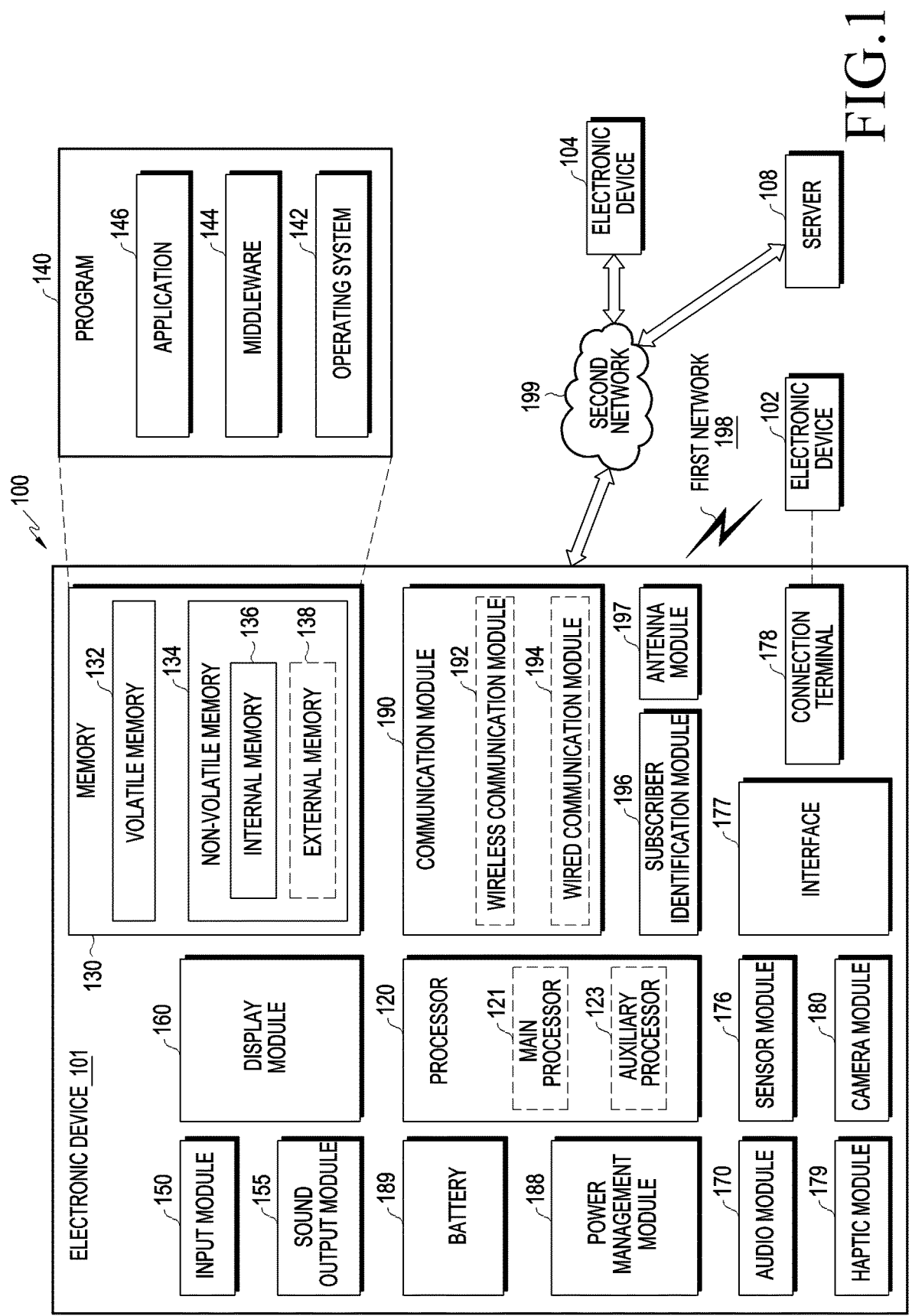
FIG. 1 is a block diagram of an electronic device in a network environment according to an embodiment.

Certain embodiments may provide an electronic device and a method for shape recognition based on stroke analysis in an electronic device, where when the user writes, a part of the written content is naturally recognized as a shape and then displayed accordingly without requiring a separate menu selection.

Certain embodiments may provide an electronic device and a method for shape recognition based on stroke analysis in an electronic device, where when the user writes, a single stroke can be automatically recognized as one of writing data or shape, and the recognized shape can be displayed based on a pen drawing option including the thickness, brush, or color of the pen currently used by the user.

According to certain embodiments, when the user writes, a part of the written content may be naturally recognized as a shape and then displayed accordingly without function selection (or menu selection).

According to certain embodiments, when the user writes, a single stroke may be automatically recognized as one of writing data or shape, and the recognized shape may be displayed by applying a pen drawing option including the thickness, brush, or color of the pen currently used by the user, thereby expressing the recognized shape with the drawing option desired by the user.

The terms used herein are merely for the purpose of describing particular embodiments and may be not intended to limit the scope of other embodiments. A singular expression may include a plural expression unless the context clearly indicates otherwise. All terms used herein, including technical and scientific terms, have the same meaning as those commonly understood by a person skilled in the art to which the disclosure pertains. Such terms defined in a generally used dictionary may be interpreted to have the same or similar meaning as the contextual meanings of the related art, and are not to be interpreted to have ideal or excessively formal meanings unless clearly defined herein. In some cases, even the term defined herein should not be interpreted to exclude embodiments of the disclosure.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
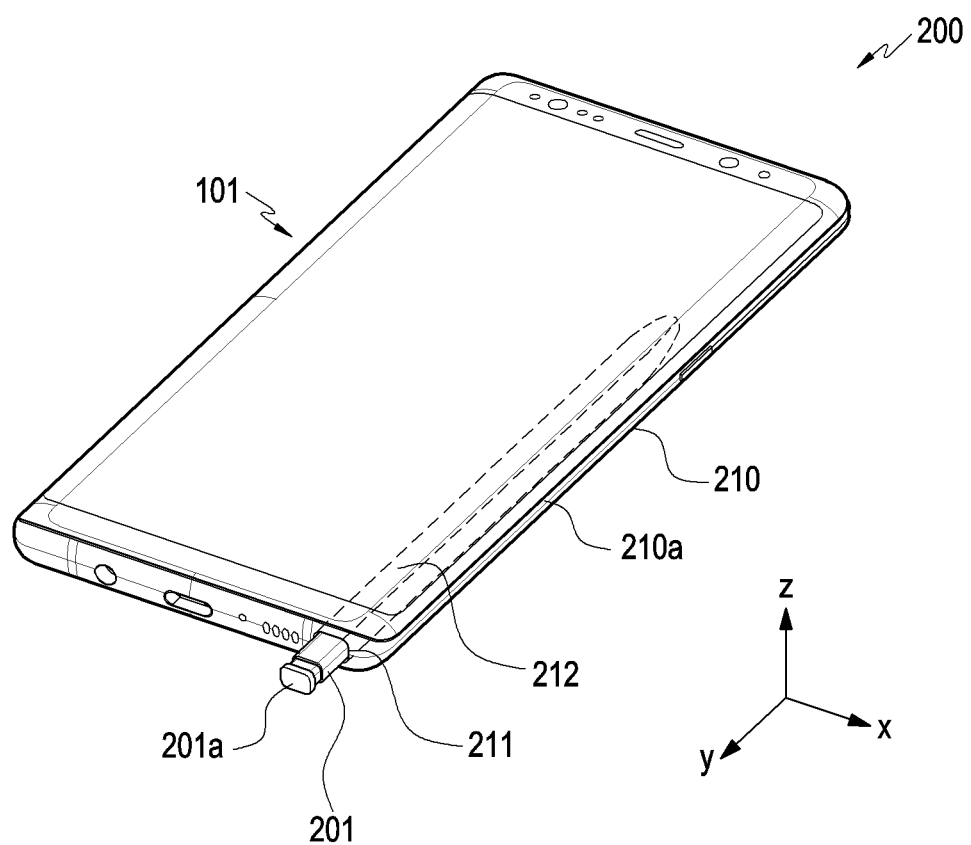
FIG. 2 is a perspective view of an electronic device including a stylus pen according to an embodiment.

FIG. 2 is a perspective view 200 of an electronic device including a stylus pen according to an embodiment.

Referring to FIG. 2, an electronic device 101 according to an embodiment may include the configurations shown in FIG. 1, and may include a structure into which a stylus pen 201 can be inserted. The electronic device 101 may include a housing 210 and a hole 211 in a part of the housing 210, for example, a part of a side surface 210a. The electronic device 101 may include a first internal space 212 that is a storage space connected to the hole 211, and the stylus pen 201 may be inserted into the first internal space 212. According to the illustrated embodiment, the stylus pen 201 may include a pressable first button 201a at one end thereof such that the stylus pen 201 can be easily taken out from the first internal space 212 of the electronic device 101. When the first button 201a is pressed, a repulsion mechanism (e.g., a repulsion mechanism implemented by at least one elastic member (e.g., spring)) configured in association with the first button 201a operates, so that the stylus pen 201 may be ejected from the first internal space 212.

According to another embodiment, the electronic device 101 may include a structure in which the stylus pen 201 can be attached to the electronic device 101. For example, the electronic device 101 may include at least one magnetic material at a position adjacent to an attachment area such that the stylus pen 201 can be attached to the outside of the housing 210. The stylus pen 201 may be attached to the outside of the housing 210 of the electronic device 101 by using the at least one magnetic material.

According to still another embodiment, the stylus pen 201 may be configured separately without being inserted into or attached to the electronic device 101 and used, and the electronic device 101 may not include a structure into which the stylus pen 201 can be inserted.

Figure 3A:
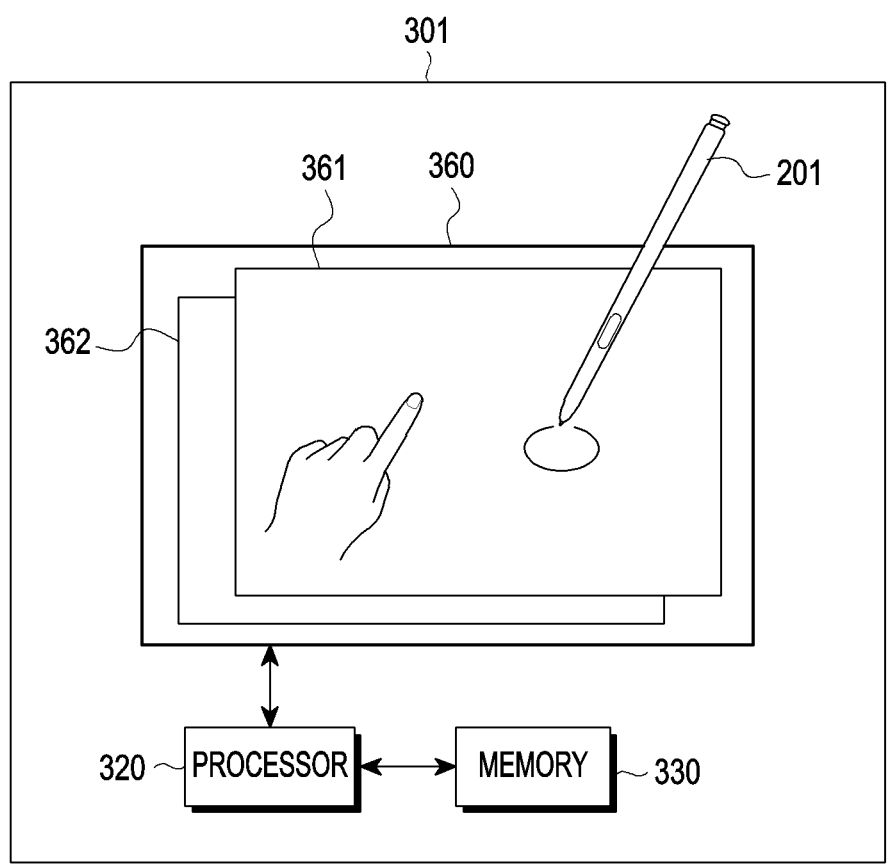
FIG. 3A is a block diagram of an electronic device for performing stroke analysis-based shape recognition according to an embodiment.

FIG. 3A is a block diagram of an electronic device for performing stroke analysis-based shape recognition according to an embodiment.

Referring to FIG. 3A, a display device (or display) 360 (e.g., the display device 160 of FIG. 1) configured to sense or detect an input of the stylus pen 201 according to an embodiment may be provided to an electronic device 301 (e.g., the electronic device 101 of FIG. 1). The display device 360 may not only output data, but may also sense touches.

The display device 360 according to an embodiment may include a sensing panel 361 and a display panel 362. Although it is illustrated that the sensing panel 361 is included in the display device 360 in FIG. 3A, in another embodiment the sensing panel may form a layered structure with the display panel 362 but not included in the display device 360.

The sensing panel 361 according to an embodiment may detect a position of a touch input of the stylus pen 201, and the display panel 362 may output an image. The display device 360 according to an embodiment may further include a driving circuit (not shown) for controlling the display panel 362 to output an image through the display panel 362.

When the stylus pen 201 supports electro-magnetic resonance (EMR), the sensing panel 361 according to an embodiment may be configured as an EMR type or an electro-magnetic interface (EMI) type input pad using an electromagnetic sensor, and this is merely an example, and may also be configured as an electrically coupled resonance (ECR) type or other type of input pad.

The sensing panel 361 according to an embodiment may detect magnetic field from the stylus pen 201 and detect a position of the stylus pen 201 therefrom. The sensing panel 361 may include one or more panels configuring a mutually layered structure in order to sense an input by using a plurality of sensors.

The sensing panel 361 according to an embodiment may be implemented as a touch screen panel (TSP), and if the sensing panel is implemented as a touch screen panel, it may identify the position of the stylus pen 201 based on an output signal from an electrode. The stylus pen 201 according to an embodiment may be implemented as an active electrostatic (AES) stylus, and a person skilled in the art will understand that and there is no limitation in the type of the implementation. In addition to the stylus pen 201, the sensing panel 361 according to an embodiment may sense contact or proximity of the human body (e.g., the user's finger). For example, the sensing panel 361 may sense touch-down, touch-move, or touch-up input by the stylus pen 201 or the user's finger. The sensing panel 361 may generate an input signal corresponding to the touch-down, touch-move, or touch-up input by the stylus pen 201 or the user's finger, and transmit the input signal to a processor 320. The sensing panel 361 according to an embodiment may transmit multiple touch points (touch point about every 3 ms (e.g., 120 touch points per second), for example) to the processor 320 at a specified time interval, based on an input of touch-move (e.g., drawing) after a touch-down.

The display panel 362 according to an embodiment may receive and display data from the processor 320. For example, the display panel 362 may display an application screen according to the execution of an application (e.g., a note application) from the processor 320, and may display at least one stroke data on the application screen.

The configuration of the display device 360 shown in FIG. 3A is merely an example, and the type and number of panels configuring the display device 360, and positions of upper and lower layers of panels may be variously changed according to how the electronic device 101 is manufactured.

According to an embodiment, the processor 320 may receive a touch-down, touch-move, or touch-up input signal by the stylus pen 201 or human body (e.g., the user's finger) from the sensing panel 361. For example, the touch-down, the touch-move, or the touch-up by the stylus pen 201 may be a first touch-down, a first touch-move, or a first touch-up, respectively. Conversely, the touch-down, the touch-move, or the touch-up by the user's finger may be a second touch-down, a second touch-move, or a second touch-up, respectively. The processor 320 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 320 according to an embodiment may receive, from the sensing panel 361, touch points (e.g., one touch point about every 3 ms or about 120 touch points per second) in a first specified time interval, based on an input of the first touch-move (e.g., drawing) after the first touch-down. The processor 320 according to an embodiment may identify a stroke trajectory (e.g., first stroke trajectory), based on the touch points received from the sensing panel 361 at the first specified time interval, and control to display, on the display panel 362, stroke data (e.g., first stroke data or written stroke data) according to the first stroke trajectory. The processor 320 according to an embodiment may receive, from the sensing panel 361, a first touch-up signal based on an input of a first touch-up during the first touch-move. The processor 320 according to an embodiment may store the first stroke data as one stroke data, based on the reception of the first touch-up signal.

The processor 320 according to an embodiment may determine whether a shape recognition trigger has occurred during the first touch-move (e.g., drawing) after the first touch-down. The processor 320 according to an embodiment may perform shape recognition on the first stroke data (i.e. the first stroke trajectory), based on the occurrence of the shape recognition trigger during the first touch-move after the first touch-down. The processor 320 according to an embodiment may obtain stroke data (e.g., second stroke data or shape stroke data) for a recognized shape when the shape recognition of the first stroke data according to the first stroke trajectory succeeds, and display the second stroke data (when the touch-up (e.g. first touch-up) for the first touch-down is not performed). For example, the processor 320 may display the first stroke data and the second stroke data together, or display the second stroke data instead of the first stroke data (e.g., stopping displaying the first stroke data or not displaying the same). For example, the processor 320 may apply a pen drawing option (e.g., thickness of the pen, brush, color, and/or another option) of the second stroke data as a first pen drawing option applied to the first stroke data, and display the second stroke data to which the first pen drawing option is applied. The processor 320 according to an embodiment may end the shape recognition operations while displaying the second stroke data instead of the first stroke data when a first touch-up event occurs during the display of the second stroke data. The processor 320 according to an embodiment may cancel (or stop) the display of the second stroke data when the first touch-up event does not occur during the display of the second stroke data and the first touch-move is continued, and continue the operation of updating and displaying the first stroke data according to the first stroke trajectory at the first specified time interval.

The processor 320 according to an embodiment may receive, from the sensing panel 361, a touch-down point in which a first touch-down is performed and touch points at the first specified time interval after the touch-down point, based on the input of the first touch-move (e.g., drawing) after the first touch-down. The processor 320 according to an embodiment may store the touch-down point as a stroke start point, and control to display, on the display panel 362, the first stroke data according to the first stroke trajectory based on the touch points received at the first specified time interval. For example, the first stroke data according to the first stroke trajectory may be updated and displayed at the first specified time interval. The processor 320 according to an embodiment may identify the size of the first stroke trajectory and the distance between the stroke start point and a current point (e.g., first point or end point on the first stroke trajectory at the current time point) on the first stroke trajectory every second specified time interval (e.g., within several ms or about 100 ms) while displaying the first stroke data according to the first stroke trajectory. The processor 320 according to an embodiment may determine whether the size of the first stroke trajectory is greater than a specified size and the distance between the stroke start point and the current point on the first stroke trajectory is less than a distance between the stroke start point and a previous point (e.g., a point before a second specified time interval from the current point) on the first stroke trajectory. The processor 320 according to an embodiment may generate a shape recognition trigger (e.g., a first shape recognition trigger) when the size of the first stroke trajectory is greater than the specified size and the distance between the stroke start point and the current point on the stroke trajectory is less than the distance between the stroke start point and the previous point on the first stroke trajectory. For example, the processor 320 according to an embodiment may perform shape recognition on the first stroke data according to the first stroke trajectory when the size of the first stroke trajectory is greater than the specified size and the distance between the stroke start point and the current point on the first stroke trajectory is less than the distance between the stroke start point and the previous point on the first stroke trajectory. The processor 320 according to an embodiment may obtain stroke data (e.g., second stroke data or shape stroke data) for a recognized shape when the shape recognition of the first stroke data according to the first stroke trajectory succeeds, and display the second stroke data (when the first touch-up is not performed). For example, the processor 320 may display the first stroke data and the second stroke data together, or display the second stroke data instead of the first stroke data. For example, the processor 320 may apply a pen drawing option (e.g., thickness of the pen, brush, color, or another option) of the second stroke data as a first pen drawing option applied to the first stroke data, and display the second stroke data to which the first pen drawing option is applied. The processor 320 according to an embodiment may end the shape recognition operations while the second stroke data is displayed when the first touch-up event occurs during the display of the second stroke data. The processor 320 according to an embodiment may cancel (or stop) the display of the second stroke data when the first touch-up event does not occur during the display of the second stroke data and the first touch-move is continued, and continue the operation of updating and displaying the first stroke data according to the first stroke trajectory at the first specified time interval.

The processor 320 according to an embodiment may receive, from the sensing panel 361, a first touch-down point and touch points at the first specified time interval after the first touch-down point, based on the input of the first touch-move (e.g., drawing) after the first touch-down. The processor 320 according to an embodiment may control to display, on the display panel 362, the first stroke data according to the first stroke trajectory, based on the touch points received at the first specified time interval from the touch-down point (e.g., the stroke start point). For example, the first stroke data according to the first stroke trajectory may be updated and displayed at the first specified time interval. The processor 320 according to an embodiment may identify (or determine) whether a hold motion event has occurred while displaying the first stroke data according to the first stroke trajectory. The processor 320 according to an embodiment may receive a touch point corresponding to the hold motion (e.g., the state in which a touch is maintained in a predetermined area (e.g., 8 px×8 px) for a first specified time) from the user from the sensing panel 361 during the display of the first stroke data according to the first stroke trajectory, and determine whether the hold motion event has occurred.

The processor 320 according to an embodiment may generate a shape recognition trigger (e.g., a second shape recognition trigger) when the hold motion event occurs during the display of the first stroke data according to the first stroke trajectory. The processor 320 according to an embodiment may perform shape recognition on the first stroke data according to the first stroke trajectory when the hold motion event occurs during the display of the first stroke data according to the first stroke trajectory. The processor 320 according to an embodiment may obtain stroke data (e.g., second stroke data or shape stroke data) for a recognized shape when the shape recognition of the first stroke data according to the first stroke trajectory succeeds, and display the second stroke data (when the first touch-up is not performed). For example, the processor 320 may display the first stroke data and the second stroke data together, or display the second stroke data instead of the first stroke data. For example, the processor 320 may apply a pen drawing option (e.g., thickness of the pen, the brush, the color, and/or another option) of the second stroke data as a first pen drawing option applied to the first stroke data, and display the second stroke data to which the first pen drawing option is applied. The processor 320 according to an embodiment may end the shape recognition operations while the second stroke data is displayed when the first touch-up event occurs while displaying the second stroke data. The processor 320 according to an embodiment may cancel (or stop) the display of the second stroke data when the first touch-up event does not occur and the first touch-move is continued while displaying the second stroke data, and continue the operation of updating and displaying the first stroke data according to the first stroke trajectory at the first specified time interval.

The processor 320 according to an embodiment may receive a first touch-down point from the sensing panel 361, based on the input of the first touch-move (e.g., drawing) after the first touch-down, and receive touch points at the first specified time interval according to the first touch-move. The processor 320 according to an embodiment may control to display, on the display panel 362, the first stroke data according to the first stroke trajectory based on the touch points received at the first specified time interval from the touch-down point (e.g., the stroke start point). For example, the first stroke data according to the first stroke trajectory may be updated at the first specified time interval and displayed. The processor 320 according to an embodiment may determine whether the hold motion event has occurred during the display of the first stroke data according to the first stroke trajectory. The processor 320 according to an embodiment may receive a touch point corresponding to the hold motion (e.g., the state in which a touch is maintained in a predetermined area (e.g., 8 px×8 px) for a first specified time) from the user from the sensing panel 361 during the display of the first stroke data according to the first stroke trajectory, and determine whether the hold motion event has occurred. The processor 320 according to an embodiment may determine whether a stroke trajectory (e.g., second stroke trajectory) associated with the first stroke trajectory exists, when the hold motion event occurs during the display of the first stroke data according to the first stroke trajectory. For example, the second stroke trajectory associated with the first stroke trajectory may be a stroke trajectory pre-input within a specified time interval or a specified distance from the first stroke trajectory. The processor 320 according to an embodiment may generate a second shape recognition trigger if the second stroke trajectory associated with the first stroke trajectory does not exist when the hold motion event occurs. The processor 320 according to an embodiment may perform shape recognition on the first stroke data according to the first stroke trajectory if the second stroke trajectory associated with the first stroke trajectory does not exist when the hold motion event occurs, obtain stroke data (e.g., second stroke data or shape stroke data) for a recognized shape when the shape recognition succeeds, and display the second stroke data. The processor 320 according to an embodiment may generate a third shape recognition trigger if the second stroke trajectory associated with the first stroke trajectory exists when the hold motion event occurs. The processor 320 according to an embodiment may perform shape recognition on the first stroke data according to the first stroke trajectory and stroke data (e.g., merged stroke data) according to the second stroke trajectory if the second stroke trajectory associated with the first stroke trajectory exists when the hold motion event occurs, obtain third stroke data for a recognized shape when the shape recognition succeeds, and display the third stroke data. For example, the processor 320 may display the merged stroke data and the third stroke data together, or display the third stroke data instead of the merged stroke data. For example, the processor 320 may apply a pen drawing option (e.g., thickness of the pen, brush, color, and/or another option) of the third stroke data as a first pen drawing option applied to the merged stroke data, and display the third stroke data to which the first pen drawing option is applied. The processor 320 according to an embodiment may end the shape recognition operations while displaying the third stroke data instead of the merged stroke data when the first touch-up event occurs during the display of the third stroke data. The processor 320 according to an embodiment may cancel (or stop) the display of the third stroke data according to the first stroke trajectory when the first touch-up event does not occur during the display of the third stroke data and the first touch-move is continued, and continue the operation of updating and displaying the first stroke data at the first specified time interval.

The processor 320 according to an embodiment may receive, from the sensing panel 361, touch points at the first specified time interval from the first touch-down point, based on the input of the first touch-move (e.g., drawing) after the first touch-down in a second touch-down state. According to another embodiment, the second touch-down may be identified while the touch points are received based on the input of the first touch-move (e.g., drawing) after the first touch-down when initially the second touch-down is not detected. The processor 320 according to an embodiment may control to display, on the display panel 362, the first stroke data according to the first stroke trajectory based on the touch points received at the first specified time interval from the first touch-down point (e.g., the stroke start point). For example, the first stroke data according to the first stroke trajectory may be updated at the first specified time interval and displayed. The processor 320 according to an embodiment may determine whether a second touch-up has occurred with respect to the second touch-down during the display of the first stroke data according to the first stroke trajectory. The processor 320 according to an embodiment generate a shape recognition trigger (e.g., fourth shape recognition trigger) when the second touch-up occurs with respect to the second touch-down during the display of the first stroke data according to the first stroke trajectory. According to another embodiment, when the first touch-up occurs while the second touch-down is maintained during the display of the first stroke data according to the first stroke trajectory, the processor 320 may generate the shape recognition trigger. According to an embodiment, shape recognition on the first stroke data according to the first stroke trajectory may be performed when the shape recognition trigger occurs during the display of the first stroke data according to the first stroke trajectory, stroke data (e.g., second stroke data or shape stroke data) for a recognized shape may be obtained when the shape recognition succeeds, and the second stroke data may be displayed. For example, the processor 320 may display the first stroke data and the second stroke data together, or display the second stroke data instead of the first stroke data. For example, the processor 320 may apply a pen drawing option (e.g., thickness of the pen, brush, color, and/or another option) of the second stroke data as a first pen drawing option applied to the first stroke data, and display the second stroke data to which the first pen drawing option is applied. The processor 320 according to an embodiment may end the shape recognitions operations while the second stroke data is displayed when the first touch-up event occurs during the display of the second stroke data. The processor 320 according to an embodiment may cancel (or stop) the display of the second stroke data when the first touch-up event does not occur during the display of the second stroke data and the first touch-move is continued, and continue the operation of updating and displaying the first stroke data according to the first stroke trajectory at the first specified time interval.

A memory 330 according to an embodiment may store various pieces of data used by at least one component (e.g., the processor 320 and the display device 360) of the electronic device 301. The data may include, for example, input data or output data for software (e.g., a program) and a command related thereto. For example, the memory 330 may store instructions for performing an operation of the electronic device 101 (or the processor 320).

Figure 3B:
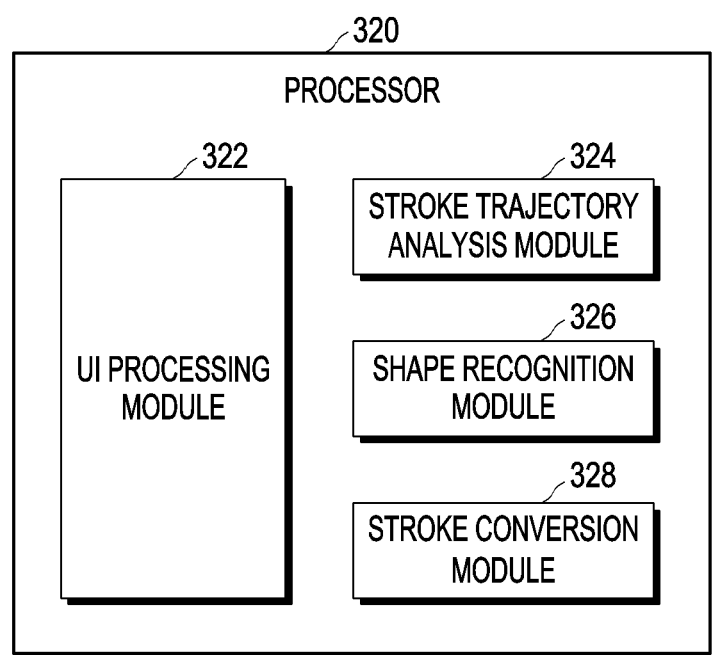
FIG. 3B illustrates a processor configuration of an electronic device according to an embodiment.

FIG. 3B illustrates a processor configuration of an electronic device according to an embodiment.

Referring to FIG. 3B, the processor 320 (e.g., the processor 120 of FIG. 1) of an electronic device (e.g., the electronic device 101 of FIG. 1 or the electronic device 301 of FIG. 3A) (hereinafter, the electronic device 301 of FIG. 3a is described as an example) may perform operations of a user interface processing module (UI processing module) 322, a stroke trajectory analysis module 324, a shape recognition module 326, and/or a stroke conversion module 328. For example, the UI processing module 322, the stroke trajectory analysis module 324, the shape recognition module 326, and/or the stroke conversion module 328 may be a software module executed by the processor 320. Alternatively, the UI processing module 322, the stroke trajectory analysis module 324, the shape recognition module 326, and/or the stroke conversion module 328 may be a hardware module included in the processor 320 or existing independently.

The UI processing module 322 according to an embodiment may perform processing for displaying an application execution screen and displaying stroke data (e.g., first stroke data, second stroke data, or third stroke data) on the application execution screen. For example, the UI processing module 322 may display first stroke data to which a first drawing option is applied, based on a first pen drawing option applied to the first stroke data, or apply the first pen drawing option to the second stroke data or third stroke data and display the same.

The stroke trajectory analysis module 324 according to an embodiment may analyze a first stroke trajectory based on touch points received at a first specified time interval according to a first touch-move from a first touch-down point (e.g., stroke start point). The stroke trajectory analysis module 324 according to an embodiment may generate a shape recognition trigger, based on the first stroke trajectory analysis.

For example, the stroke trajectory analysis module 324 may identify the size of the first stroke trajectory and the distance between the stroke start point and a current point (e.g., a first point or end point on the first stroke trajectory at the current time point) on the first stroke trajectory every second specified time interval (e.g., within several ms or 100 ms), so as to determine whether the size of the first stroke trajectory is greater than a specified size and the distance between the stroke start point and the current point on the first stroke trajectory is less than a distance between the stroke start point and a previous point (e.g., a point before a second specified time interval from the current point) on the first stroke trajectory. The stroke trajectory analysis module 324 may generate a shape recognition trigger (e.g., first shape recognition trigger) when the size of the first stroke trajectory is greater than the specified size and the distance between the stroke start point and the current point on the first stroke trajectory is less than the distance between the stroke start point and the previous point on the stroke trajectory.

In another example, the stroke trajectory analysis module 324 may determine whether a hold motion (e.g., the state in which a touch is maintained in a predetermined area (e.g., 8 px×8 px) for a first specified time interval) event has occurred on the first stroke trajectory. The stroke trajectory analysis module 324 may generate a shape recognition trigger (e.g., second shape recognition trigger) if the hold motion event occurs on the first stroke trajectory.

In still another example, the stroke trajectory analysis module 324 may determine whether a hold motion (e.g., the state in which a touch is maintained in a predetermined area (e.g., 8 px×8 px) for a first specified time interval) event has occurred on the first stroke trajectory, and whether a second stroke trajectory associated with the first stroke trajectory exists. When the second stroke trajectory associated with the first stroke trajectory does not exist when the hold motion event has occurred on the first stroke trajectory, the stroke trajectory analysis module 324 may generate a shape recognition trigger (e.g., the second shape recognition trigger) for the first stroke data. When the second stroke trajectory associated with the first stroke trajectory exists when the hold motion event has occurred on the first stroke trajectory, the stroke trajectory analysis module 324 may generate a shape recognition trigger (e.g., third shape recognition trigger) for the first stroke data and previous stroke data.

In still another example, the stroke trajectory analysis module 324 may identify occurrence of a second touch-up event during the processing of the first stroke trajectory based on the touch points received at the first specified time interval, based on the first touch-move from the first touch-down point (e.g., the stroke start point) in a second touch-down state. The stroke trajectory analysis module 324 may generate a shape recognition trigger (e.g., fourth shape recognition trigger) for the first stroke data according to the first stroke trajectory when the second touch-up event occurs during the processing of the first stroke trajectory. According to another embodiment, when a first touch-up occurs while the second touch-down is maintained during the display of the first stroke data according to the first stroke trajectory, the processor 320 may generate the shape recognition trigger.

The shape recognition module 326 according to an embodiment may perform shape recognition according to the first stroke trajectory, based on the occurrence of the shape recognition trigger (e.g., the first shape recognition trigger, second shape recognition trigger, third shape recognition trigger, or fourth shape recognition trigger) generated by the stroke trajectory analysis module 324, or perform shape recognition on a merged stroke trajectory according to the first stroke trajectory and the second stroke trajectory. For example, the shape recognition module 326 may analyze the first stroke trajectory or the merged stroke trajectory to identify a shape form. For example, the shape form may include various shape forms made of points and lines. For example, the shape form may include the shape of a closed curve such as a triangle, a rectangle, a circle, an ellipse, a trapezoid, or a star, or may include a straight line or a curved line.

The stroke conversion module 328 according to an embodiment may convert the first stroke data into second stroke data of the recognized first shape form, based on the recognized first shape form for the first stroke trajectory. For example, the stroke conversion module 328 may obtain the converted second stroke data by rearranging points of the first stroke data in the recognized first shape form. The stroke conversion module 328 according to an embodiment may convert the merged stroke data into third stroke data of the recognized second shape form, based on the recognized second shape form for the merged stroke trajectory. For example, the stroke conversion module 328 may obtain the converted third stroke data by rearranging points of the merged stroke data in the recognized second shape form. The stroke conversion module 328 according to an embodiment may provide the second stroke data or the third stroke data to the UI processing module 322 to be displayed on the display panel 362. As such, the stroke conversion is performed by a separate stroke conversion module 328 rather than the UI processing module 322 which processes the UI threads, and thus the load on the processing amount of the UI processing module 322 is small, so that it is possible to prevent a delay from occurring in the UI processing module 322 performing touch or UI interaction processing.

According to an embodiment, an electronic device (e.g., the electronic device 101 of FIG. 1 or the electronic device 301 of FIG. 3A) may include a display (e.g., the display device 160 of FIG. 1 or the display device 360 of FIG. 3A), a memory (e.g., the memory 130 of FIG. 1 or the memory 330 of FIG. 3), and at least one processor (e.g., the processor 120 of FIG. 1 or the processor 320 of FIG. 3) operatively coupled to the display and the memory, wherein the memory stores instructions that are configured to, when executed, enable the at least one processor to display first stroke data of a first stroke trajectory, based on an input of a first touch-move after a first touch-down on the display, perform shape recognition on the first stroke trajectory, based on a size of the first stroke trajectory and a distance between a stroke start point of the first stroke trajectory and another point on the first stroke trajectory, convert the first stroke data into second stroke data corresponding to a recognized shape form, based on the shape recognition, and display the second stroke data on the display.

According to an embodiment, the instructions may be configured to cause the at least one processor to perform the shape recognition on the first stroke trajectory, when the size of the first stroke trajectory is greater than a specified size and a first distance between the stroke start point and a first point on the first stroke trajectory is less than a second distance between the stroke start point and a second point inputted before the first point on the first stroke trajectory.

According to an embodiment, the instructions may be configured to, when executed, enable the at least one processor to stop displaying the second stroke data when the input of the first touch-move is continued without a touch-up for the first touch-down after displaying the second stroke data.

According to an embodiment, the instructions may be configured to, when executed, enable the at least one processor to stop displaying the first stroke data and display the second stroke data.

According to an embodiment, the instructions may be configured to, when executed, enable the at least one processor to display the second stroke data together with the first stroke data.

According to an embodiment, the instructions may be configured to, when executed, enable the at least one processor to identify a first pen drawing option corresponding to the first stroke data, and apply the first pen drawing option to the second stroke data to display the second stroke data.

According to an embodiment, the instructions may be configured to, when executed, enable the at least one processor to perform the shape recognition on the first stroke trajectory, based on whether a hold motion event has occurred while displaying the first stroke data of the first stroke trajectory.

According to an embodiment, the instructions may be configured to, when executed, enable the at least one processor to identify whether a second stroke trajectory associated with the first stroke trajectory is stored in the memory, based on whether the hold motion event has occurred while displaying the first stroke data of the first stroke trajectory, when the second stroke trajectory associated with the first stroke trajectory is stored in the memory, perform shape recognition on merged stroke data according to merging of the first stroke trajectory and the second stroke trajectory, convert the merged stroke data into third stroke data corresponding to another recognized shape form, based on the shape recognition on the merged stroke data, and display the third stroke data on the display.

According to an embodiment, the instructions may be configured to, when executed, enable the at least one processor to identify a second touch-down while displaying the first stroke data of the first stroke trajectory on the display, and perform the shape recognition on the first stroke trajectory, based on occurrence of a second touch-up for the second touch-down.

According to an embodiment, the first touch-down and the first touch-move may be inputs by a stylus pen, and the second touch-down may be an input by a user's finger.

Figure 4:
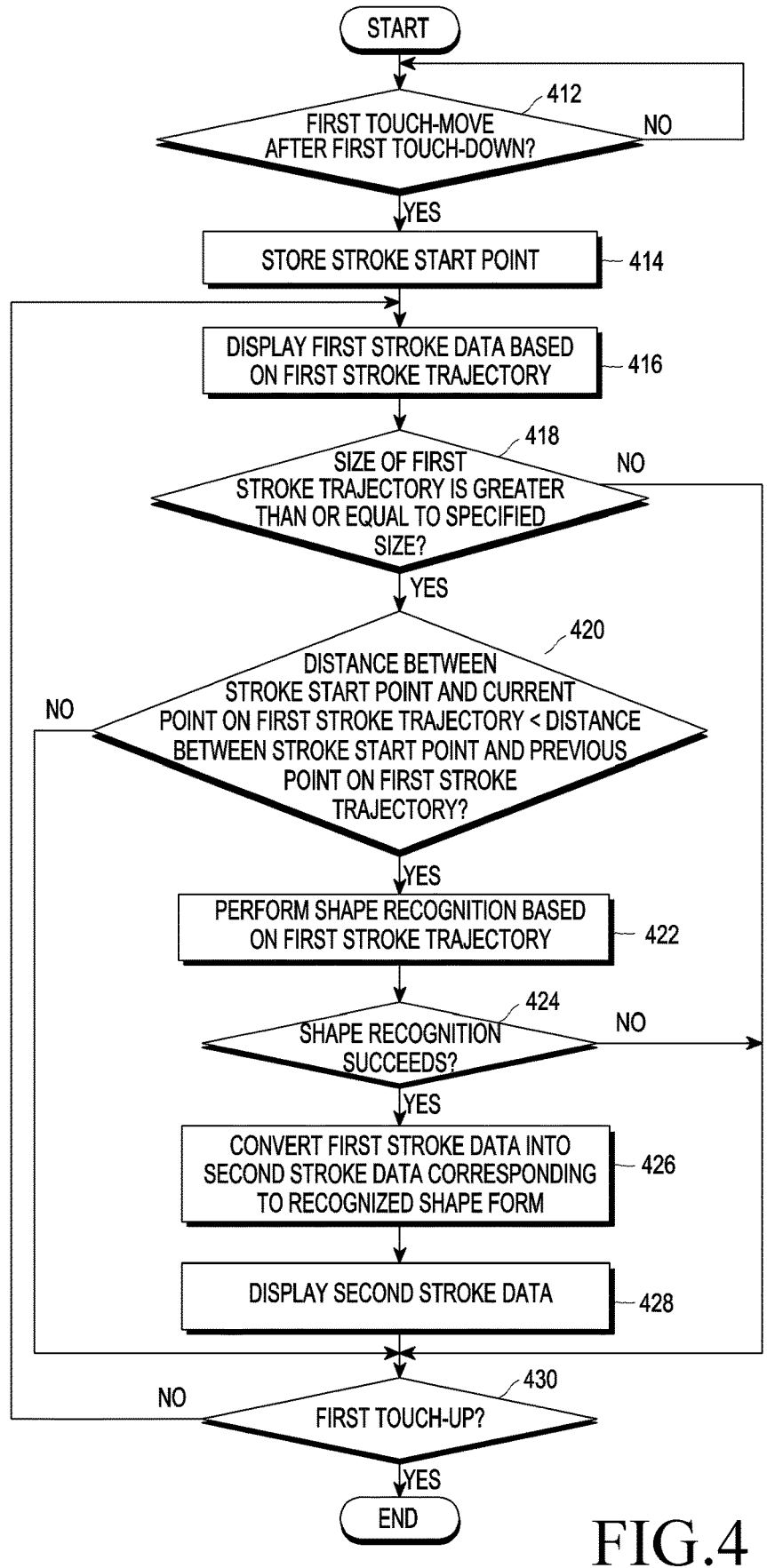
FIG. 4 is a flowchart illustrating a shape recognition operation based on a first stroke trajectory analysis in an electronic device according to an embodiment.

FIG. 4 is a flowchart illustrating a shape recognition operation based on a first stroke trajectory analysis in an electronic device according to an embodiment.

Referring to FIG. 4, a processor (e.g., the processor 120 of FIG. 1 or the processor 320 of FIG. 3) of an electronic device (e.g., the electronic device 101 of FIG. 1 or the electronic device 301 of FIG. 3A) according to an embodiment may perform at least one of operations 412 to 430.

In operation 412, the processor 320 according to an embodiment may determine whether a first touch-move (e.g., drawing) is input after a first touch-down. The processor 320 according to an embodiment may receive, from the sensing panel 361, a touch-down point in which a first touch-down is performed, and receive touch points at a first specified time interval, based on the input of the first touch-move after the first touch-down.

In operation 414, the processor 320 according to an embodiment may store a stroke start point. For example, the processor 320 may store, in the memory 330, as the stroke start point, the touch-down point in which the first touch-down is performed.

In operation 416, the processor 320 according to an embodiment may display first stroke data according to a first stroke trajectory. For example, the processor 320 may control to display, on the display panel 362, the first stroke data according to the first stroke trajectory based on the touch points received at the first specified time interval from the sensing panel 361. For example, the first stroke data according to the first stroke trajectory may be updated at the first specified time interval and displayed.

In operation 418, the processor 320 according to an embodiment may determine whether the size of the first stroke trajectory is greater than or equal to a specified size. For example, the processor 320 may identify the size of the first stroke trajectory every second specified time interval (e.g., within several ms or about 100 ms) while displaying the first stroke data according to the first stroke trajectory, and determine whether the size of the first stroke trajectory is greater than or equal to the specified size (e.g., a specified pixel size of about 100×100 pixel size). According to an embodiment, the processor 320 may proceed to operation 430 when the size of the first stroke trajectory is not greater than or equal to the specified size. According to an embodiment, the processor 320 may perform operation 420 when the size of the first stroke trajectory is greater than or equal to the specified size.

In operation 420, the processor 320 according to an embodiment may determine whether the distance between the stroke start point and a current point on the first stroke trajectory is less than the distance between the stroke start point and a previous point (e.g., a point before a second specified time interval from the current point) on the first stroke trajectory. The processor 320 according to an embodiment may proceed to operation 430 when the distance between the stroke start point and the current point on the first stroke trajectory is not less than the distance between the stroke start point and the previous point on the first stroke trajectory. The processor 320 according to an embodiment may perform operation 422 when the distance between the stroke start point and the current point on the first stroke trajectory is less than the distance between the stroke start point and the previous point on the first stroke trajectory (when the occurrence of a shape recognition trigger (e.g., first shape recognition trigger) is identified).

In operation 422, the processor 320 according to an embodiment may perform shape recognition on the first stroke data according to the first stroke trajectory. For example, the processor 320 may analyze the first stroke trajectory through the shape recognition module 326 to identify a shape form. For example, the shape form may include various shape forms made of points and lines. For example, the shape form may include the shape of a closed curve such as a triangle, a rectangle, a circle, an ellipse, a trapezoid, or a star, or may include a straight line or a curved line.

In operation 424, the processor 320 according to an embodiment may determine whether the shape recognition succeeds. The processor 320 according to an embodiment may proceed to operation 430 when the shape recognition fails. The processor 320 according to an embodiment may identify a recognized shape form when the shape recognition succeeds.

In operation 426, the processor 320 according to an embodiment may convert the first stroke data corresponding to the first stroke trajectory into second stroke data corresponding to the recognized shape form. For example, the processor 320 may change the position of at least one point among a plurality of points included in the first stroke data so as to form the recognized shape form.

In operation 428, the processor 320 according to an embodiment may display the second stroke data corresponding to the recognized shape form. For example, the processor 320 may display the first stroke data and the second stroke data together, or display the second stroke data instead of the first stroke data. For example, the processor 320 may apply a pen drawing option (e.g., thickness of the pen, brush, color, or another option) of the second stroke data as a first pen drawing option applied to the first stroke data, and display the second stroke data to which the first pen drawing option is applied.

In operation 430, the processor 320 according to an embodiment may determine whether a first touch-up event has occurred. The processor 320 according to an embodiment may cancel (or stop) the display of the second stroke data when the first touch-up event does not occur, and continue the operation of updating and displaying the first stroke data according to the first stroke trajectory at the first specified time interval. When the first touch-up event occurs, the processor 320 according to an embodiment may end the shape recognition operations while the second stroke data is displayed. According to an embodiment, a method for shape recognition based on stroke analysis in an electronic device (e.g., the electronic device 101 of FIG. 1 or the electronic device 301 of FIG. 3a) may include, based on an input of a first touch-move after a first touch-down on a display (e.g., the display device 160 of FIG. 1 or the display device 360 of FIG. 3a) of the electronic device, displaying first stroke data of a first stroke trajectory on the display, performing shape recognition on the first stroke trajectory, based on a size of the first stroke trajectory and a distance between a stroke start point of the first stroke trajectory and another point on the first stroke trajectory, converting the first stroke data into second stroke data corresponding to a recognized shape form, based on the shape recognition, and displaying the second stroke data on the display.

According to an embodiment, in the method, the electronic device may perform the shape recognition on the first stroke trajectory, when the size of the first stroke trajectory is greater than a specified size and a first distance between the stroke start point and a first point on the first stroke trajectory is less than a second distance between the stroke start point and a second point inputted before the first point on the first stroke trajectory.

According to an embodiment, in the method, the electronic device may stop displaying the second stroke data when the input of the first touch-move is continued without a touch-up for the first touch-down after displaying the second stroke data.

According to an embodiment, in the method, the electronic device may stop displaying the first stroke data and display the second stroke data.

According to an embodiment, in the method, the electronic device may display the second stroke data together with the first stroke data.

According to an embodiment, in the method, the electronic device may identify a first pen drawing option corresponding to the first stroke data, and apply the first pen drawing option to the second stroke data to display the second stroke data.

Figure 5:
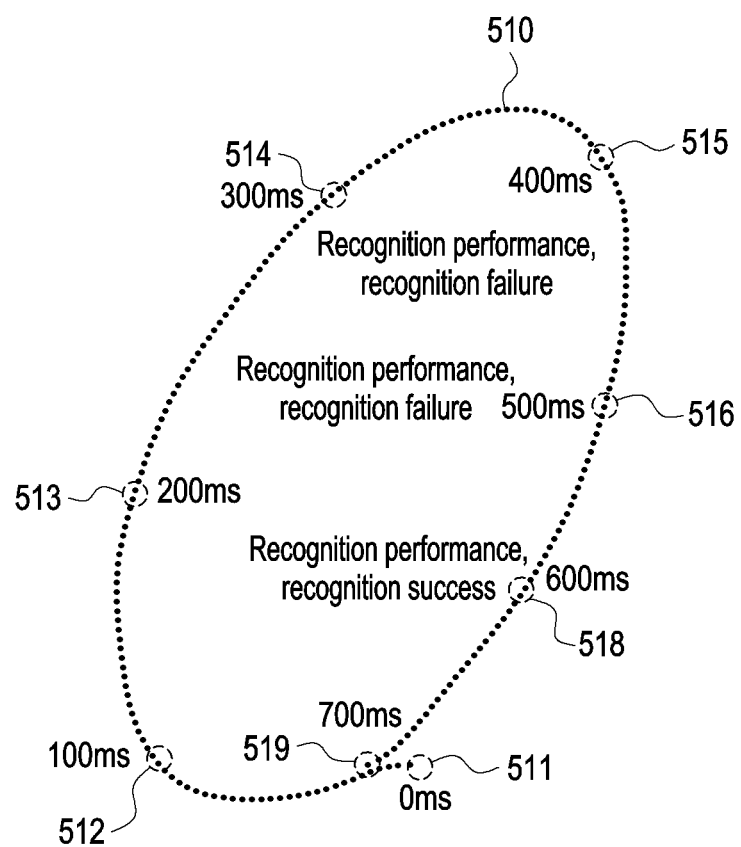
FIG. 5 illustrates an example of shape recognition based on a size of a first stroke trajectory and a distance between a stroke start point and a current point on a first stroke trajectory, according to an embodiment.

FIG. 5 illustrates an example of shape recognition based on a size of a first stroke trajectory and a distance between a stroke start point and a current point on a first stroke trajectory, according to an embodiment.

Referring to FIG. 5, an example of the case where a first stroke trajectory 510 according to an embodiment is a stroke trajectory obtained based on drawing of an ellipse by the user for about 700 ms from a stroke start point 511 may be shown. The processor 320 according to an embodiment may receive, from the sensing panel 361, a touch-down point 511 in which a first touch-down is performed and touch points at a first specified time interval after the touch-down point, based on an input of a first touch-move (e.g., drawing) after the first touch-down. The processor 320 may then display first stroke data corresponding to the first stroke trajectory 510 starting (or progressing) from the stroke start point 511, while updating first stroke data.

The processor 320 according to an embodiment may identify the size of the first stroke trajectory and the distance between the stroke start point 511 and a current point on the first stroke trajectory 510 every second specified time interval (e.g., about 100 ms or several ms) while the first stroke trajectory 510 is in progress.

According to an embodiment, at about the 100 ms after the stroke start point 511, the processor 320 may identify the size of the first stroke trajectory and the distance between the stroke start point 511 and the first point 512 on the first stroke trajectory. At 100 ms, the size of the first stroke trajectory is less than the specified size and the distance between the stroke start point 511 and the first point 512 on the first stroke trajectory is greater than the distance between the stroke start point 511 and a previous point of the first point 512 on the first stroke trajectory (e.g. the distance between the stroke start point 511 and a previous point of the first point 512 at this time may be zero), the processor 320 may identify that the shape recognition trigger has not occurred, and may not perform shape recognition.

According to an embodiment, at about the 200 ms time point from the time point of the stroke start point 511, the processor 320 may identify the size of the first stroke trajectory and the distance between the stroke start point 511 and a second point 513 on the first stroke trajectory. At 200 ms, the size of the first stroke trajectory is less than the specified size and the distance between the stroke start point 511 and the second point 513 on the first stroke trajectory is greater than the distance between the stroke start point 511 and the first point 512 on the first stroke trajectory, the processor 320 may identify that the shape recognition trigger has not occurred, and may not perform shape recognition.

According to an embodiment, at about the 300 ms time point from the time point of the stroke start point 511, the processor 320 may identify the size of the first stroke trajectory and the distance between the stroke start point 511 and a third point 514 on the first stroke trajectory. At 300 ms, the size of the first stroke trajectory is greater than the specified size and the distance between the stroke start point 511 and the third point 514 on the first stroke trajectory is greater than the distance between the stroke start point 511 and the second point 513 on the first stroke trajectory, the processor 320 may identify that the shape recognition trigger has not occurred, and may not perform shape recognition.

According to an embodiment, at about the 400 ms time point from the time point of the stroke start point 511, the processor 320 may identify the size of the first stroke trajectory and the distance between the stroke start point 511 and a fourth point 515 on the first stroke trajectory. At 400 ms, the size of the first stroke trajectory is greater than the specified size and the distance between the stroke start point 511 and the fourth point 515 on the first stroke trajectory is less than the distance between the stroke start point 511 and the third point 514 on the first stroke trajectory, the processor 320 may identify that the shape recognition trigger has occurred, and may perform shape recognition. The processor 320 may continue to analyze the first stroke trajectory when shape recognition fails at about the 400 ms time point.

According to an embodiment, at about the 500 ms time point from the time point of the stroke start point 511, the processor 320 may identify the size of the first stroke trajectory and the distance between the stroke start point 511 and a fifth point 516 on the first stroke trajectory. At 500 ms, the size of the first stroke trajectory is greater than the specified size and the distance between the stroke start point 511 and the fifth point 516 on the first stroke trajectory is less than the distance between the stroke start point 511 and the fourth point 515 on the first stroke trajectory, the processor 320 may identify that the shape recognition trigger has occurred, and may perform shape recognition. The processor 320 may continue to analyze the first stroke trajectory when shape recognition fails at about the 500 ms time point.

According to an embodiment, at about the 600 ms time point from the time point of the stroke start point 511, the processor 320 may identify the size of the first stroke trajectory and the distance between the stroke start point 511 and a sixth point 518 on the first stroke trajectory. At 600 ms, the size of the first stroke trajectory 510 is greater than the specified size and the distance between the stroke start point 511 and the sixth point 518 on the first stroke trajectory is less than the distance between the stroke start point 511 and the fifth point 516 on the first stroke trajectory, the processor 320 may identify that the shape recognition trigger has occurred, and may perform shape recognition. For example, the processor 320 may convert the first stroke data corresponding to the first stroke trajectory 510 into second stroke data corresponding to a recognized shape form when the shape recognition succeeds, at about the 600 ms time point, and display the second stroke data.

According to an embodiment, the processor 320 may end the analysis of the first stroke trajectory while the second stroke data is displayed when a first touch-up event occurs after displaying the second stroke data corresponding to the recognized shape form at about the 600 ms time point. According to an embodiment, when the first touch-up event does not occur after displaying the second stroke data corresponding to the recognized shape form at about the 600 ms time point and the first stroke trajectory is continued (e.g., continued to a seventh point 519 on the first stroke trajectory at about the 700 ms time point), the processor 320 may cancel (or stop) displaying the second stroke data, and update and display the first stroke data. According to an embodiment, the processor 320 may end the update of the first stroke data when the first stroke trajectory is continued and then the first touch-up event occurs (e.g., a first touch-up at the seventh point 519 on the first stroke trajectory at about the 700 ms time point).

In FIG. 5, an example of analyzing the first stroke trajectory every 100 ms (identifying the size of the first stroke trajectory and the distance between the stroke start point 511 and the current point on the first stroke trajectory) has been described, but 100 ms is just an example, and the first stroke trajectory analysis may be performed in real time or in one of various time intervals, based on the performance of the processor or a data rate.

Figure 6A:
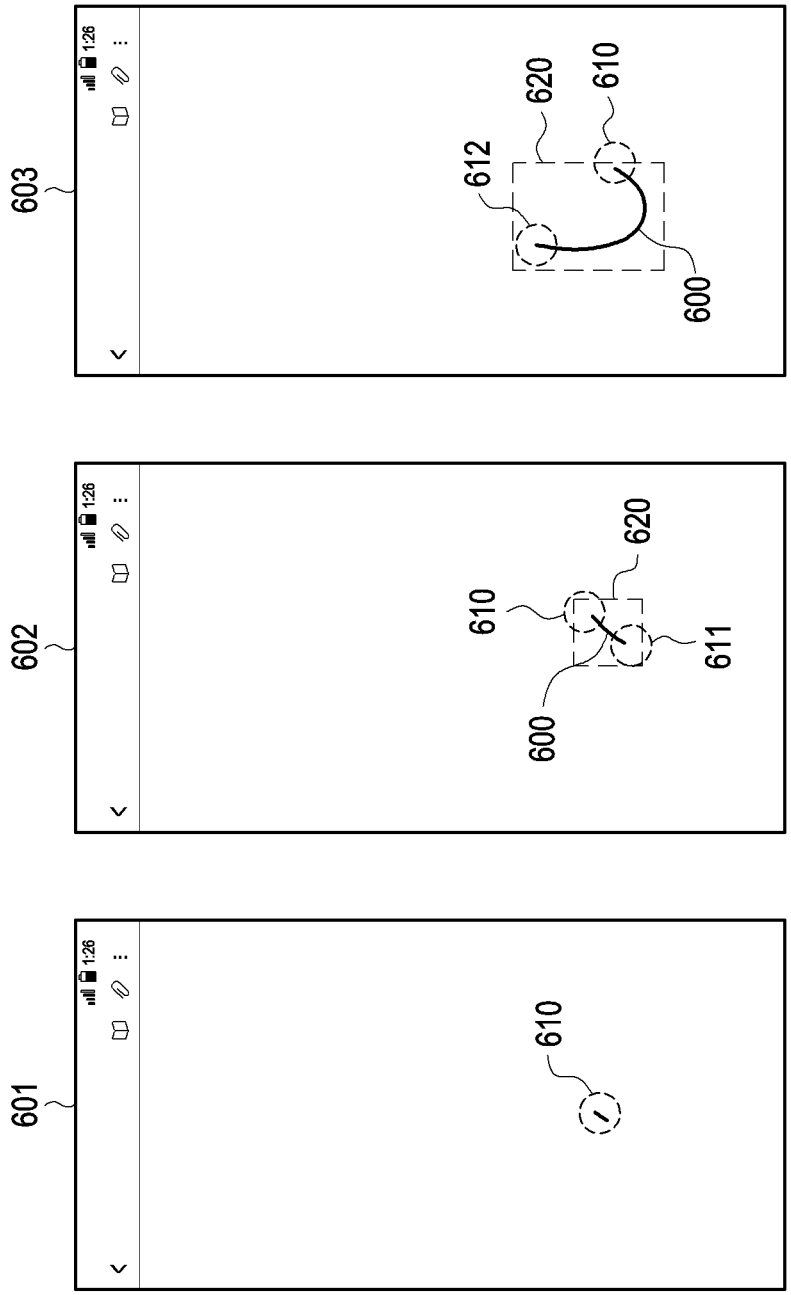
FIGS. 6A to 6C illustrate screens when an electronic device converts first stroke data into second stroke data and display the second stroke data, based on a size of first stroke and a distance between a stroke start point and a current point on a first stroke trajectory during display of the first stroke data, according to an embodiment.
Figure 6B:
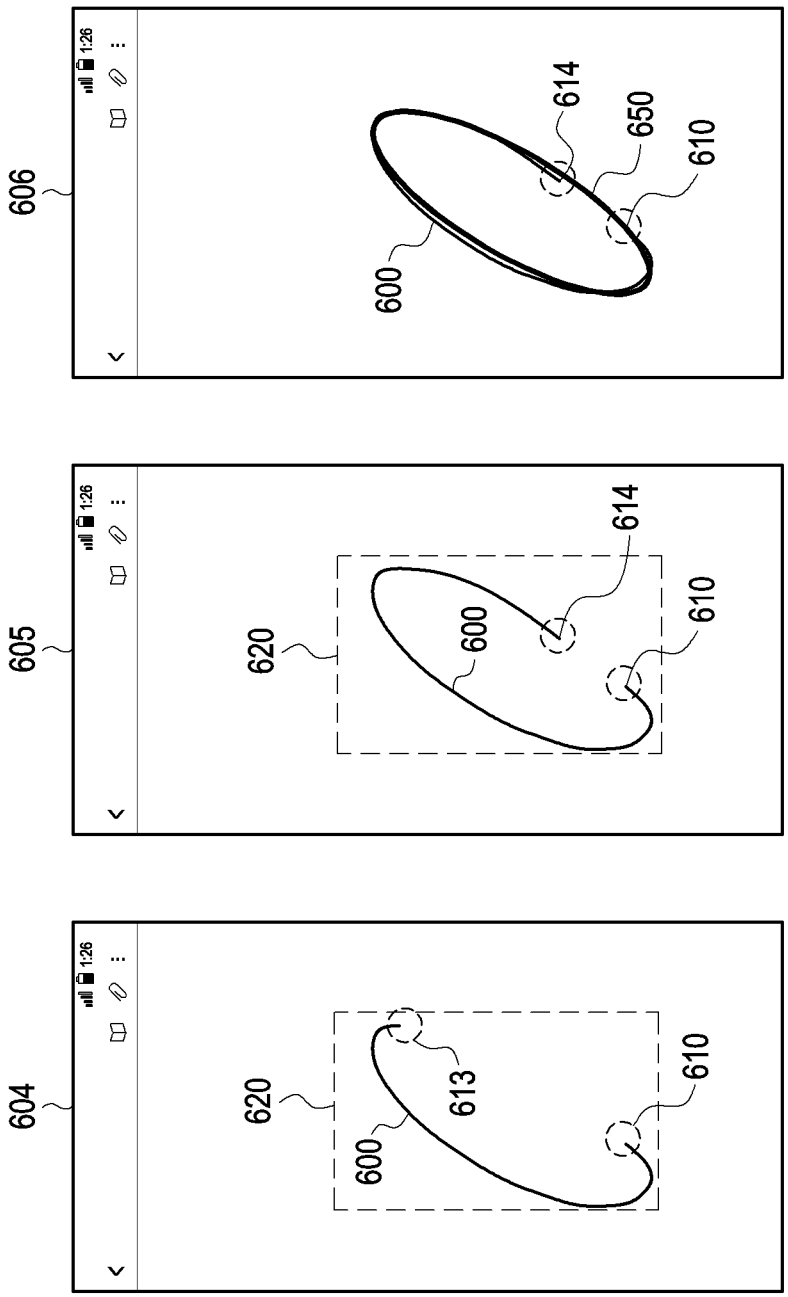
Figure 6C:
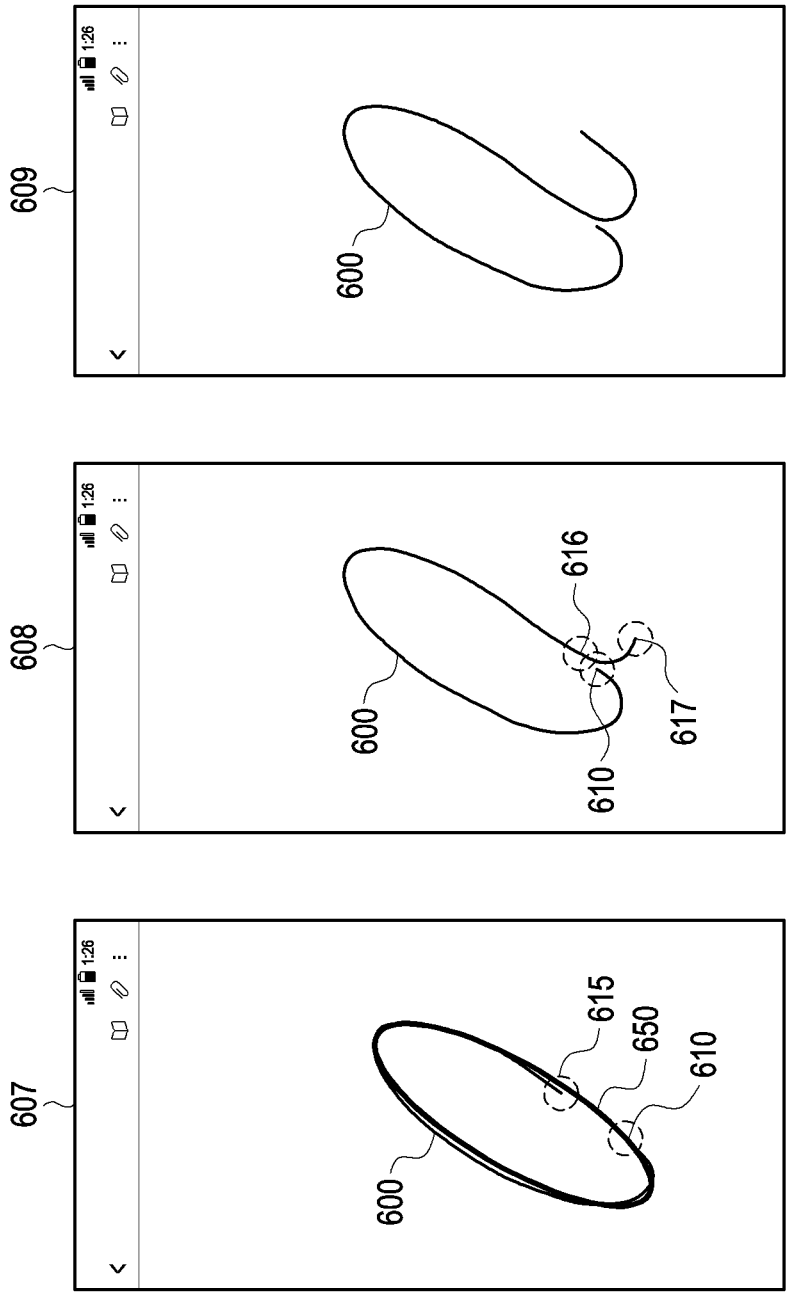

FIGS. 6A to 6C illustrate screens when an electronic device converts first stroke data into second stroke data and display the second stroke data, based on a size of first stroke and a distance between a stroke start point and a current point on a first stroke trajectory during display of the first stroke data, according to an embodiment.

Referring to FIGS. 6A to 6C, the processor 320 according to an embodiment may display a first screen 601 indicating a touch point (e.g., a stroke start point) 610 corresponding to a first touch-down, based on the first touch-down on the display device 360. Then, the processor 320 may receive touch points during a first specified time interval and display first stroke data 600 starting (or progressing) from the stroke start point 610, while updating the first stroke data. The processor 320 according to an embodiment may identify the size of the first stroke trajectory every second specified time interval (e.g., about 100 ms or several ms) while the first stroke data 600 is updated and displayed, and compare the distance between the stroke start point 610 and a current point on the first stroke trajectory with the distance between the stroke start point 610 and a previous point on the first stroke trajectory.

According to an embodiment, a second screen 602 may be an example showing the first stroke data 600 in a first state where a second specified time has elapsed after the first touch-down, the processor 320 may identify the size 620 of the first stroke trajectory in the first state, and compare the distance between the stroke start point 610 and the current point (e.g., first point) 611 on the first stroke trajectory and the distance between the stroke start point 610 and a previous point on the first stroke trajectory. When the size 620 of the first stroke trajectory is not greater than a specified size or the distance between the stroke start point 610 and the current point (e.g., the first point) 611 on the first stroke trajectory is not closer than before, the processor 320 may identify that shape recognition trigger has not occurred, and may not perform shape recognition.

According to an embodiment, a third screen 603 may be an example showing the first stroke data 600 in a second state where the second specified time has elapsed again from the first point 611. The processor 320 may identify the size 620 of the first stroke trajectory in the second state, and compare the distance between the stroke start point 610 and the current point (e.g., second point) 612 on the first stroke trajectory with the distance between the stroke start point 610 and the previous point (e.g., the first point) 611 on the first stroke trajectory. When the size 620 of the first stroke trajectory is not greater than the specified size and the distance between the stroke start point 610 and the current point (e.g., the second point) 612 on the first stroke trajectory is greater than the distance between the stroke start point 610 and the previous point (e.g., the first point) 611 on the first stroke trajectory, the processor 320 may identify that shape recognition trigger has not occurred, and may not perform shape recognition.

According to an embodiment, a fourth screen 604 may be an example showing the first stroke data 600 in a third state where the second specified time has elapsed again from the second point 612. The processor 320 may identify the size 620 of the first stroke trajectory in the third state, and compare the distance between the stroke start point 610 and the current point (e.g., third point) 613 on the first stroke trajectory with the distance between the stroke start point 610 and the previous point (e.g., the second point) 612 on the first stroke trajectory. When the size 620 of the first stroke trajectory is not greater than the specified size and the distance between the stroke start point 610 and the current point (e.g., the third point) 613 on the first stroke trajectory is greater than the distance between the stroke start point 610 and the previous point (e.g., the second point) 612 on the first stroke trajectory, the processor 320 may identify that shape recognition trigger has not occurred, and may not perform shape recognition.

According to an embodiment, a fifth screen 605 may be an example showing the first stroke data 600 in a fourth state where the second specified time has elapsed again from the third point 613. The processor 320 may identify the size 620 of the first stroke trajectory in the fourth state, and compare the distance between the stroke start point 610 and the current point (e.g., fourth point) 614 on the first stroke trajectory with the distance between the stroke start point 610 and the previous point (e.g., the third point) 613 on the first stroke trajectory. When the size 620 of the first stroke trajectory is greater than the specified size and the distance between the stroke start point 610 and the current point (e.g., the fourth point) 614 on the first stroke trajectory is less than the distance between the stroke start point 610 and the previous point (e.g., the third point) 613 on the first stroke trajectory, the processor 320 may identify that the shape recognition trigger has occurred, and may perform shape recognition.

According to an embodiment, a sixth screen 606 may be a view illustrating a fifth state where shape recognition is performed in the fourth state and the first stroke data 600 and second stroke data 650 corresponding to a recognized shape are displayed together. The processor 320 according to an embodiment may display the second stroke data 650 instead of the first stroke data 600 when a first touch-up is performed while the second stroke data 650 corresponding to the recognized shape is displayed. The processor 320 according to an embodiment may continue to display the first stroke data 600 when the first touch-up is not performed while the second stroke data 650 corresponding to the recognized shape is displayed and the first touch-move is continued.

According to an embodiment, a seventh screen 607 is a view illustrating a sixth state where the first stroke data 600 in which a fifth point 615 is updated and displayed as the first touch-move is continued in the fifth state. The fifth point 615 may be an updated version of the fourth point 614 (e.g. the fourth point 614 is moved closer to the second stroke).

An eighth screen 608 according to an embodiment may be a view illustrating a seventh state where the first touch-move is further continued for a predetermined period in the sixth state and thus a sixth point 616 is reached. For example, the sixth point 616 may be a second stroke data cancellation point. The processor 320 may cancel (or stop) the display of the second stroke data 650 when the first touch-move is continued for a predetermined period and reaches the sixth point 616, and display the first stroke data 600 updated to a seventh point 617 according to the first touch-move.

According to an embodiment, a ninth screen 609 may be a view illustrating an eighth state when the first touch-up occurs during the display of the first stroke data 600. In the eighth state, the processor 320 may end the display operation of the first stroke data 600 according to the occurrence of the first touch-up during the display of the first stroke data 600.

Figure 7:
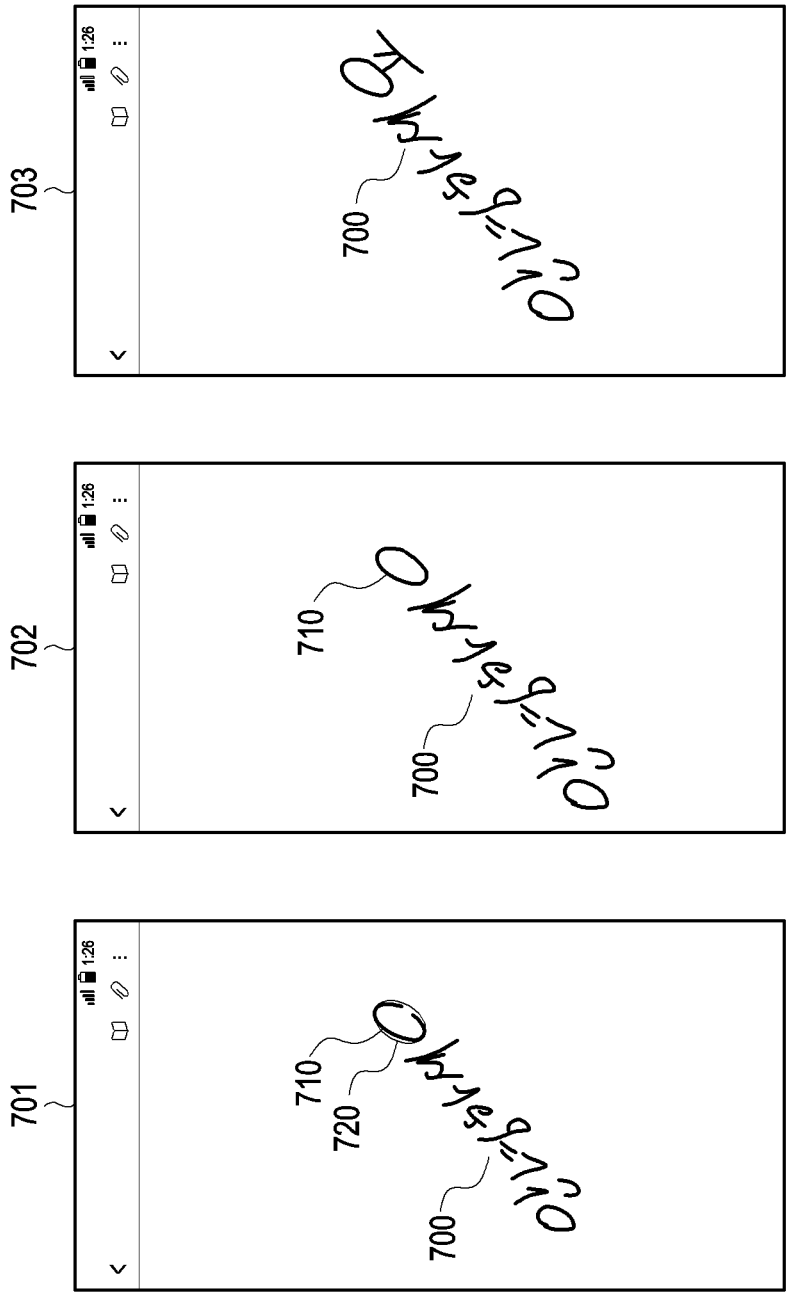
FIG. 7 illustrates an example in which first stroke data during writing is recognized as a shape and then canceled in an electronic device, according to an embodiment.

FIG. 7 illustrates an example in which first stroke data during writing is recognized as a shape and then canceled in an electronic device, according to an embodiment.

Referring to FIG. 7, the processor 320 according to an embodiment is a view illustrating an example of screens 701 to 703 in which Korean Hangul writing of " 안녕하세요 (Greeting)" 700 is input by the user on the display device 360.

According to an embodiment, the processor 320 may perform shape recognition on a first stroke trajectory of "o" 710 being written following "안녕하세" by the user, and display the first screen 701 including second stroke data 720 corresponding to the recognized shape form, that is, a circle.

According to an embodiment, when the first touch-up is not performed by the user while the second stroke data 720 is displayed and the "o" 710 is continued to be written, the processor 320 may cancel (or stop) the display of the second stroke data 720 corresponding to the circle and display first stroke data 710 of the "o" 710 being written as shown the second screen 702.

According to an embodiment, the processor 320 may complete the display of "o" 710 when the first touch-up is performed after writing "o" 710, and display the next stroke trajectory (e.g., "ㅛ") according to the next touch-down as shown the second screen 703.

According to the embodiment of the disclosure, the processor 320 may display the second stroke data, which is a shape recognition result for the first stroke data while the first stroke trajectory is in progress. However, when the first stroke trajectory continues in progress, the processor 320 may cancel the second stroke data and continues to display the first stroke trajectory. Conversely, when the first stroke trajectory does not continuously progress, the processor 320 may display the second stroke data, and thus easily determine whether to display the first stroke data or display the shape-converted second stroke data while the user makes one stroke.

Although not shown, according to another embodiment, when the user wants to write "Today" on the display device 360, the processor 320 may perform shape recognition on a first stroke trajectory of "o" being written following "T" by the user. The processor 320 may display a first screen including second stroke data corresponding to the recognized shape form (that is a circle) for the first stroke trajectory of "o" being written. When the first touch-up is not performed by the user while the second stroke data is displayed and the "o" is continued to be written, the processor 320 may cancel (or stop) the display of the second stroke data corresponding to the circle and display first stroke data of the "o" 710 being written. The processor 320 may complete the display of "o" when the first touch-up is performed after writing "o", and display the next stroke trajectory (e.g., "d") according to the next touch-down.

Figure 8:
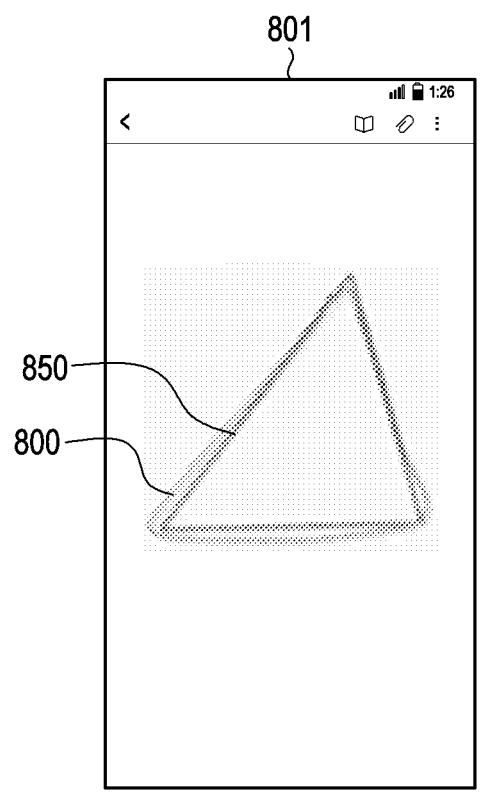
FIG. 8 illustrates an example of a screen for displaying first stroke data and second stroke data in an electronic device, according to an embodiment.

FIG. 8 illustrates an example of a screen for displaying first stroke data and second stroke data in an electronic device, according to an embodiment.

Referring to FIG. 8, when shape recognition succeeds and thus second stroke data 850 corresponding to first stroke data 800 is displayed on a screen 801 of the display 360, the processor 320 according to an embodiment may display both the first stroke data 800 and the second stroke data 850 until a first touch-up is performed. According to an embodiment, a pen drawing option (e.g., thickness of the pen, brush, color, and/or another option) of the second stroke data 850 may be applied as a first pen drawing option applied to the first stroke data 800, and the second stroke data 850 to which the first pen drawing option is applied may be displayed. For example, when the first pen drawing option applied to the first stroke data 800 is blue and a colored pencil, the blue and colored pencil options may be applied to the second stroke data 850 and displayed. According to an embodiment, when the first pen drawing option applied to the first stroke data 800 is equally applied to the second stroke data 850, at least one other drawing option (e.g., a translucent effect) for distinguishing the second stroke data 850 from the first stroke data 800 may be further applied. For example, by displaying the second stroke data 850 to be distinguished from the first stroke data 800 by using a translucent effect, it is possible for a user to intuitively recognize the second stroke data 850 to know that shape recognition is currently in progress, and easily select the conversion from the first stroke data 800 to the second stroke data 850 or cancellation of the second stroke data 850.

The processor 320 according to an embodiment may stop displaying the first stroke data 800 when a first touch-up event occurs after displaying the second stroke data 850 to which the translucent effect is applied together with the first stroke data 800, based on the success of the shape recognition, and display the second stroke data 850 without applying the translucent effect. As the first touch-up does not occur during the display of the first stroke data 800 and the second stroke data 850 to which the translucent effect is applied together and a first touch-move is continued (when a specified cancellation condition is satisfied), the processor 320 according to an embodiment may stop displaying the second stroke data 850 to which the translucent effect is applied, and continue to display the first stroke data 800.

Figure 9:
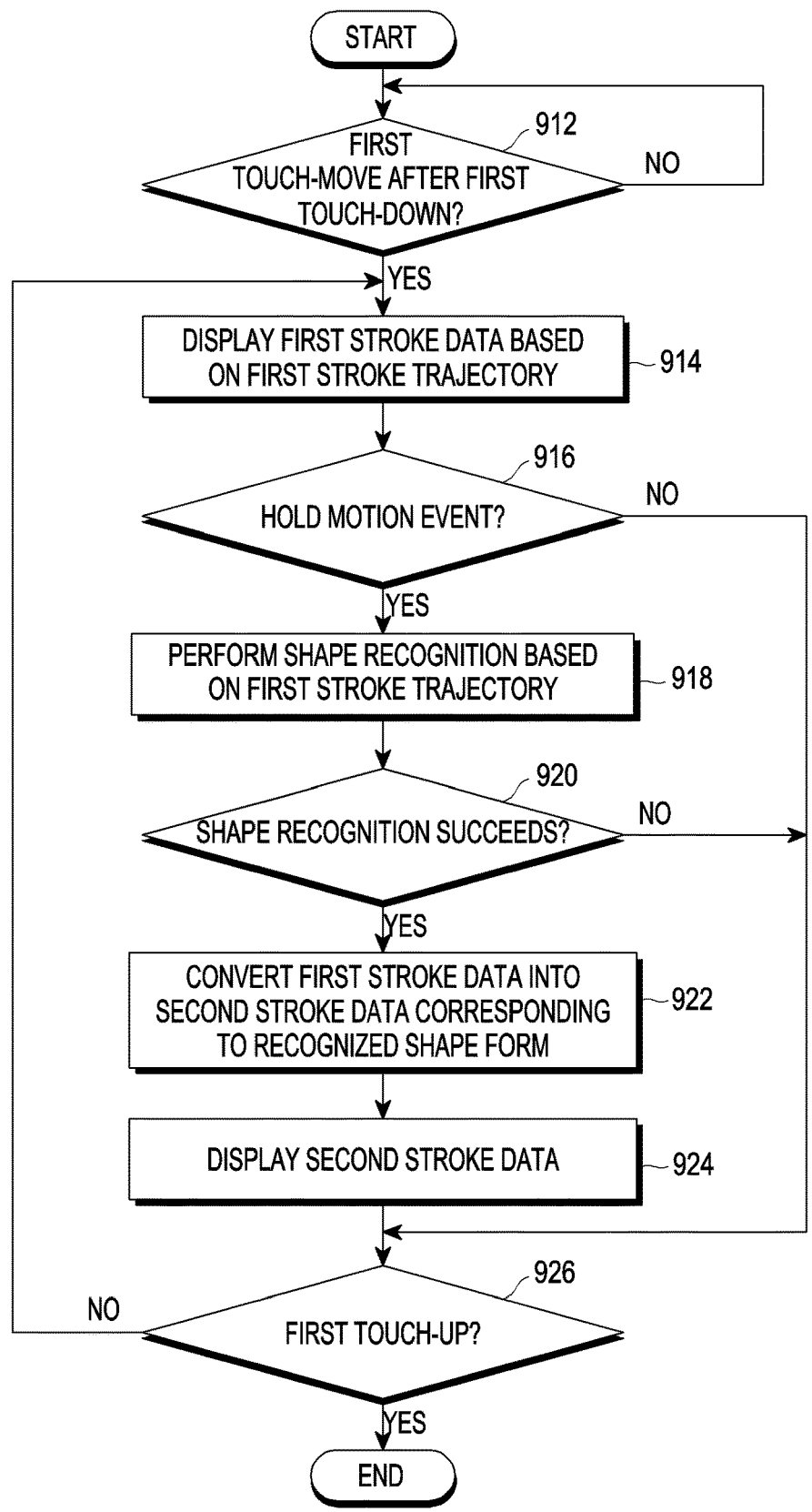
FIG. 9 is a flowchart illustrating a shape recognition operation based on a hold motion during display of first stroke data according to a first stroke trajectory in an electronic device, according to an embodiment.

FIG. 9 is a flowchart illustrating a shape recognition operation based on a hold motion during display of first stroke data according to a first stroke trajectory in an electronic device, according to an embodiment.

Referring to FIG. 9, a processor (e.g., the processor 120 of FIG. 1 or the processor 320 of FIG. 3A) of an electronic device (e.g., the electronic device 101 of FIG. 1 or the electronic device 301 of FIG. 3A) according to an embodiment may perform at least one of operations 912 to 926.

In operation 912, the processor 320 according to an embodiment may determine whether a first touch move (e.g., drawing) is input after a first touch-down. The processor 320 according to an embodiment may receive, from the sensing panel 361, a touch-down point in which the first touch-down is performed and touch points in a first specified time interval after the touch-down point, based on the input of the first touch-move (e.g., drawing) after the first touch-down.

In operation 914, the processor 320 according to an embodiment may display first stroke data according to a first stroke trajectory. For example, the processor 320 may control to display, on the display panel 362, the first stroke data according to the first stroke trajectory based on the touch points received at the first specified time interval from the sensing panel 361. For example, the first stroke data according to the first stroke trajectory may be updated at the first specified time interval and displayed.

In operation 916, the processor 320 according to an embodiment may determine whether a hold motion event has occurred. The processor 320 according to an embodiment may receive a touch point of a hold motion (e.g., the state in which a touch is maintained in a predetermined area (e.g., 8 px×8 px) for a first specified time interval) from the user from the sensing panel 361 during the display of the first stroke data according to the first stroke trajectory, and determine whether the hold motion event has occurred. According to an embodiment, when the hold motion event does not occur, the processor 320 may proceed to operation 926. According to an embodiment, when the hold motion event occurs, the processor 320 may generate a shape recognition trigger (e.g., second shape recognition trigger).

In operation 918, the processor 320 according to an embodiment may perform shape recognition according to the first stroke trajectory, when the occurrence of the hold motion event is identified. For example, the processor 320 may analyze the first stroke trajectory through the shape recognition module 324 to identify a shape form corresponding to the analysis. For example, the shape form may include various shape forms made of points and lines. For example, the shape form may include the shape of a closed curve such as a triangle, a rectangle, a circle, an ellipse, a trapezoid, or a star, or may include a straight line or a curved line.

In operation 920, the processor 320 according to an embodiment may determine whether the shape recognition succeeds. The processor 320 according to an embodiment may proceed to operation 926 when the shape recognition fails.

In operation 922, when the shape recognition succeeds, the processor 320 according to an embodiment may convert the first stroke data corresponding to the first stroke trajectory into second stroke data corresponding to a recognized shape form. For example, the processor 320 may change the position of at least one point among a plurality of points included in the first stroke data so as to form the recognized shape form.

In operation 924, the processor 320 according to an embodiment may display the second stroke data corresponding to the recognized shape form. For example, the processor 320 may display the first stroke data and the second stroke data together, or display the second stroke data instead of the first stroke data. For example, the processor 320 may apply a pen drawing option (e.g., thickness of the pen, brush, color, or another option) of the second stroke data as a first pen drawing option applied to the first stroke data, and display the second stroke data to which the first pen drawing option is applied.

In operation 926, the processor 320 according to an embodiment may determine whether a first touch-up event has occurred. The processor 320 according to an embodiment may cancel (or stop) the display of the second stroke data when the first touch-up event does not occur, and continue the operation of updating and displaying the first stroke data according to the first stroke trajectory during the first specified time interval. When the first touch-up event occurs, the processor 320 according to an embodiment may end the shape recognition operations while the second stroke data is displayed.

According to an embodiment, a method for shape recognition based on a hold motion in an electronic device (e.g., the electronic device 101 of FIG. 1 or the electronic device 301 of FIG. 3*a*) may include, based on an input of a first touch-move after a first touch-down on a display (e.g., the display device 160 of FIG. 1 or the display device 360 of FIG. 3*a*) of the electronic device, displaying first stroke data of a first stroke trajectory on the display, performing shape recognition on the first stroke trajectory, based on whether a hold motion event has occurred during the display of the first stroke data according to the first stroke trajectory, converting the first stroke data into second stroke data corresponding to a recognized shape form, based on the shape recognition, and displaying the second stroke data on the display.

Figure 10:
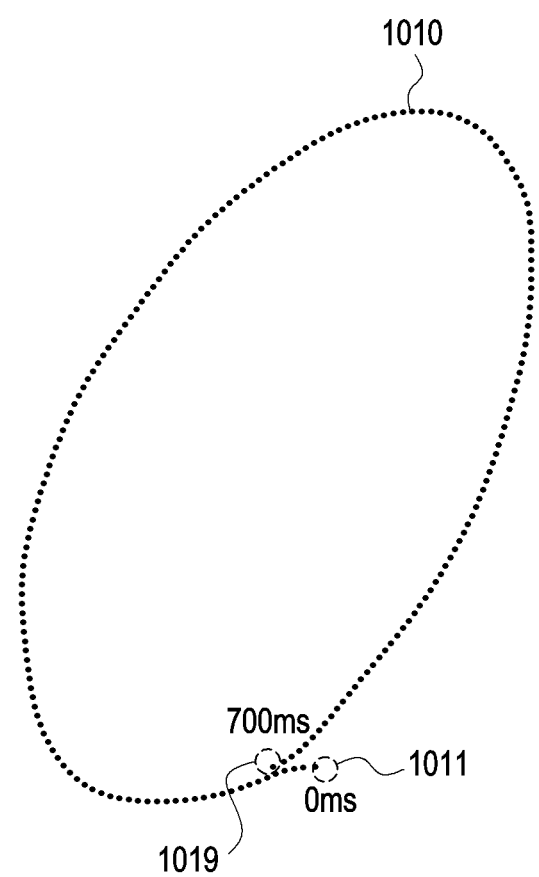
FIG. 10 illustrates an example of shape recognition based on a hold motion event while a first stroke trajectory is in progress, according to an embodiment.

FIG. 10 illustrates an example of shape recognition based on a hold motion event while a first stroke trajectory is in progress, according to an embodiment.

Referring to FIG. 10, a first stroke trajectory 1010 according to an embodiment may be a stroke trajectory obtained based on a drawing of an ellipse formed by the user for about 700 ms from the stroke start point 1011. The processor 320 according to an embodiment may receive, from the sensing panel 361, a touch-down point 1011 in which a first touch-down is performed and touch points during a first specified time interval after the touch-down point, based on the input of a first touch-move (e.g., drawing) after the first touch-down. The processor 320 may then display first stroke data 1010 starting from the stroke start point 1011, while updating the first stroke data. The processor 320 according to an embodiment may generate a shape recognition trigger at a hold motion event occurrence time point 1019 (e.g., about 700 ms after the first touch-down) when a hold motion event (e.g., when touch is maintained at the same position for a first specified time (e.g., 500 ms)) occurs while the first stroke trajectory is in progress from the stroke start point 1011, and perform shape recognition based on the occurrence of the shape recognition trigger.

Figure 11:
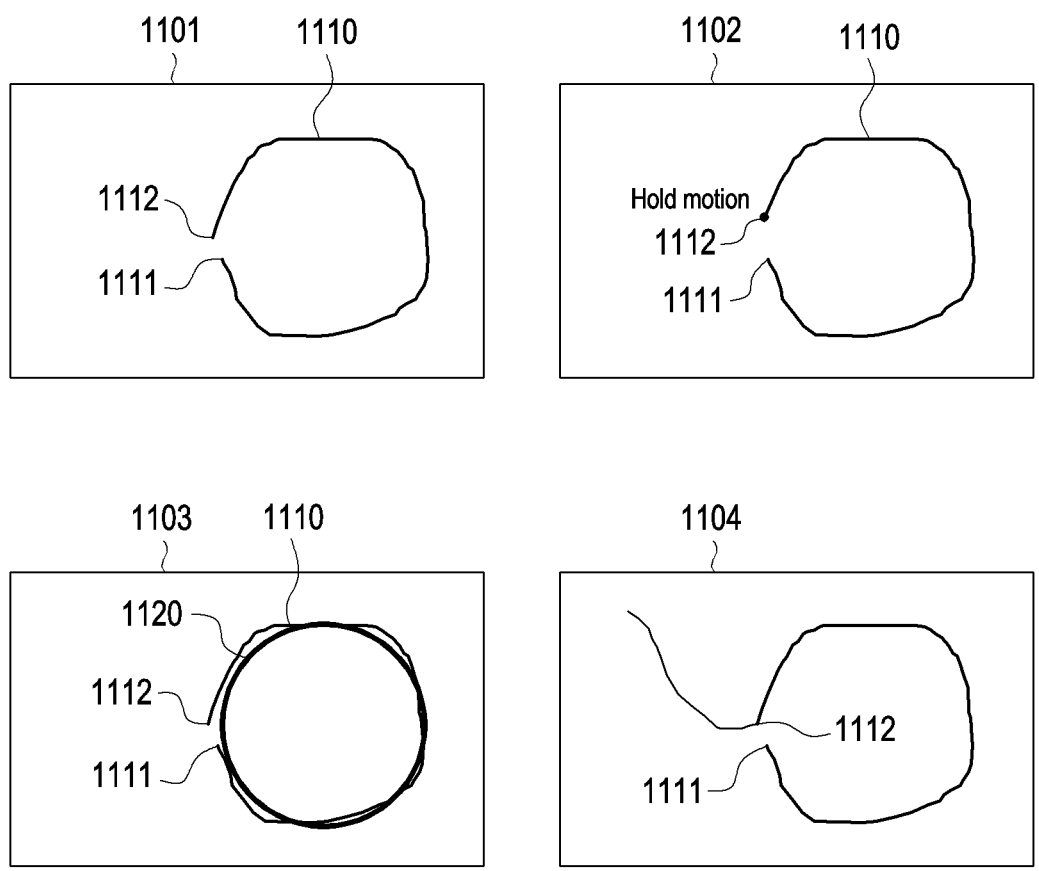
FIG. 11 is views illustrating an operation when a hold motion event occurs during display of first stroke data, according to an embodiment.

FIG. 11 is views illustrating an operation when a hold motion event occurs during display of first stroke data, according to an embodiment.

Referring to FIG. 11, the processor 320 according to an embodiment may display 1101 first stroke data 1110 according to a first stroke trajectory from a stroke start point 1111 to a first point 1112. The processor 320 according to an embodiment may identify 1102 that a hold motion event occurs at the first point 1112. The processor 320 according to an embodiment may perform shape recognition by a shape recognition trigger according to the occurrence of the hold motion event at the first point 1112, and display 1103 second stroke data 1120 corresponding to a recognized shape form. The processor 320 according to an embodiment may stop displaying the second stroke data 1120, when a first touch-up is not performed at the first point 1112 in a state where the second stroke data 1120 is displayed, and the first stroke trajectory 1110 is continued, and continue to display 1104 the first stroke trajectory 1110.

Figure 12:
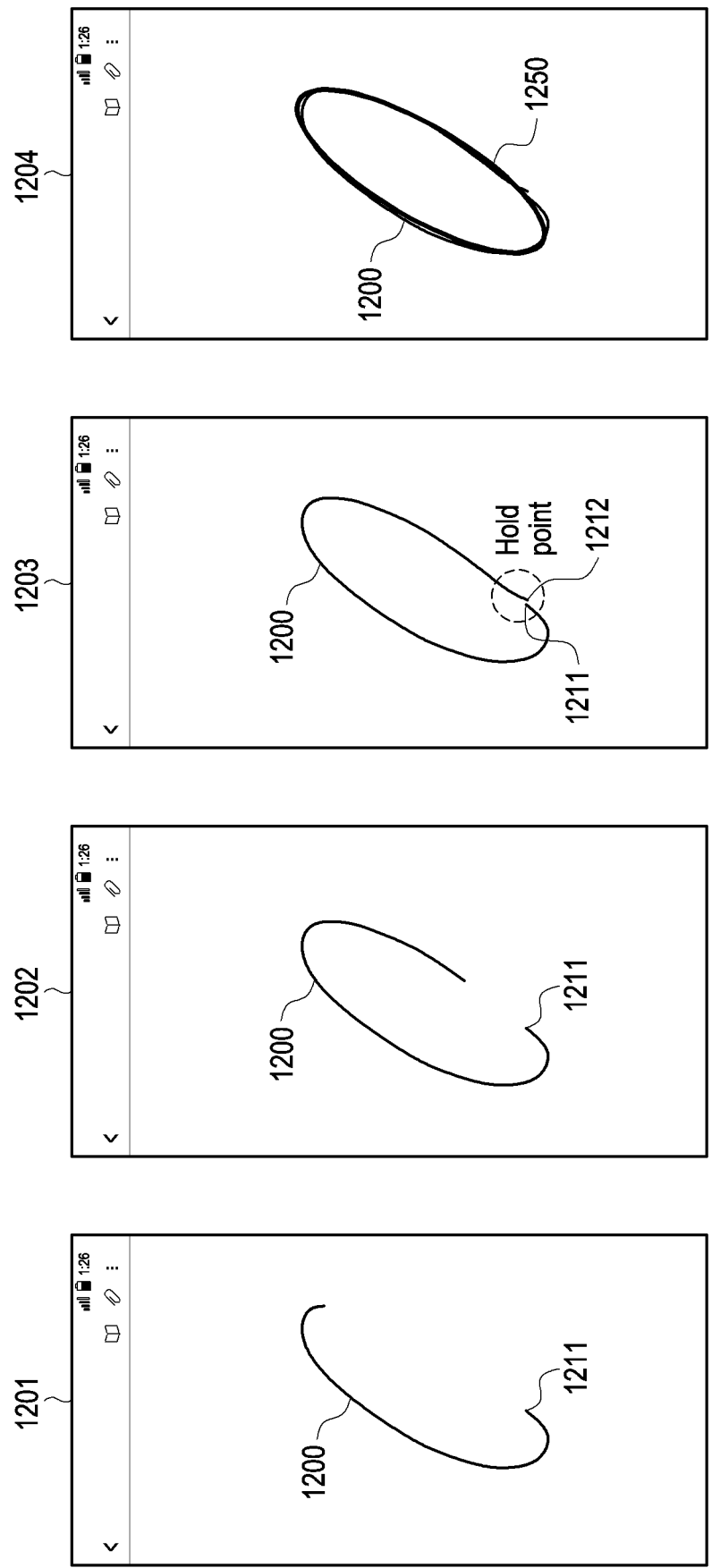
FIG. 12 illustrates screens in a case where an electronic device converts first stroke data into second stroke data and display the second stroke data, based on a hold motion event during display of the first stroke data, according to an embodiment.

FIG. 12 illustrates screens in a case where an electronic device converts first stroke data into second stroke data and display the second stroke data, based on a hold motion event during display of the first stroke data, according to an embodiment.

Referring to FIG. 12, the processor 320 according to an embodiment may receive, from the sensing panel 361, a touch-down point 1211 in which a first touch-down is performed and touch points in a first specified time interval after the touch-down point, based on an input of a first touch-move (e.g., drawing) after the first touch-down. The processor 320 may then display first stroke data 1200 starting from a stroke start point 1211, while updating the first stroke data as shown in a first screen 1201 and a second screen 1202.

When a hold motion occurs during the display of the first stroke data 1200 according to a first stroke trajectory as shown in a third screen 1203, the processor 320 according to an embodiment may generate a shape recognition trigger or identify that the shape recognition trigger has occurred. The processor 320 according to an embodiment may perform shape recognition on the first stroke data 1200 from the stroke start point 1211 to a point 1212 at which the hold motion 1212 has occurred.

When the shape recognition succeeds, the processor 320 according to an embodiment may display second stroke data 1250 corresponding to the recognized shape form as shown in a fourth screen 1204. For example, the processor 320 may display the first stroke data 1200 and the second stroke data 1250 together or display only the second stroke data 1250.

Figure 13:
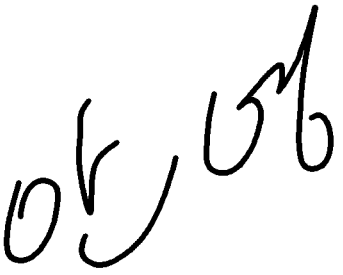
FIG. 13 illustrates an example of first stroke data and second stroke data in an electronic device, according to an embodiment.
Figure 13:
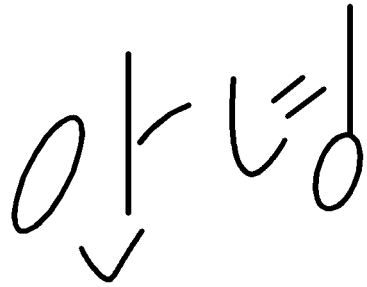
Figure 13:
Figure 13:
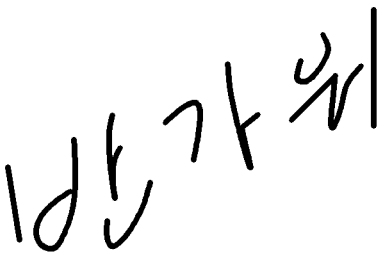

FIG. 13 illustrates an example of first stroke data and second stroke data in an electronic device, according to an embodiment.

Referring to FIG. 13, for example, in the case where the user writes a Hangul word such as ""안녕"", when a hold motion is performed while writing "○", the written "○" (first stroke data) may be recognized as a shape and displayed as a beautified "○" (second stroke data). When a hold motion is performed while writing "ㅏ", "ㅏ" (first stroke data) may be recognized as a shape and displayed as a beautified "ㅏ" (second stroke data), and thus a word such as ""안녕"" may be displayed as ""안녕"" which is beautified using shape recognition. In another example, in the case where the user writes a word such as ""반가워"", when a hold motion is performed while writing "ㅂ", the written "ㅂ" (first stroke data) may be recognized as a shape and displayed as a beautified "ㅂ" (second stroke data). When a hold motion is performed while writing "ㅏ", "ㅏ" (first stroke data) may be recognized as a shape and displayed as a beautified "ㅏ" (second stroke data), and thus a word such as ""반가워"" may be displayed as ""반가워"" which is beautified using shape recognition.

Figure 14:
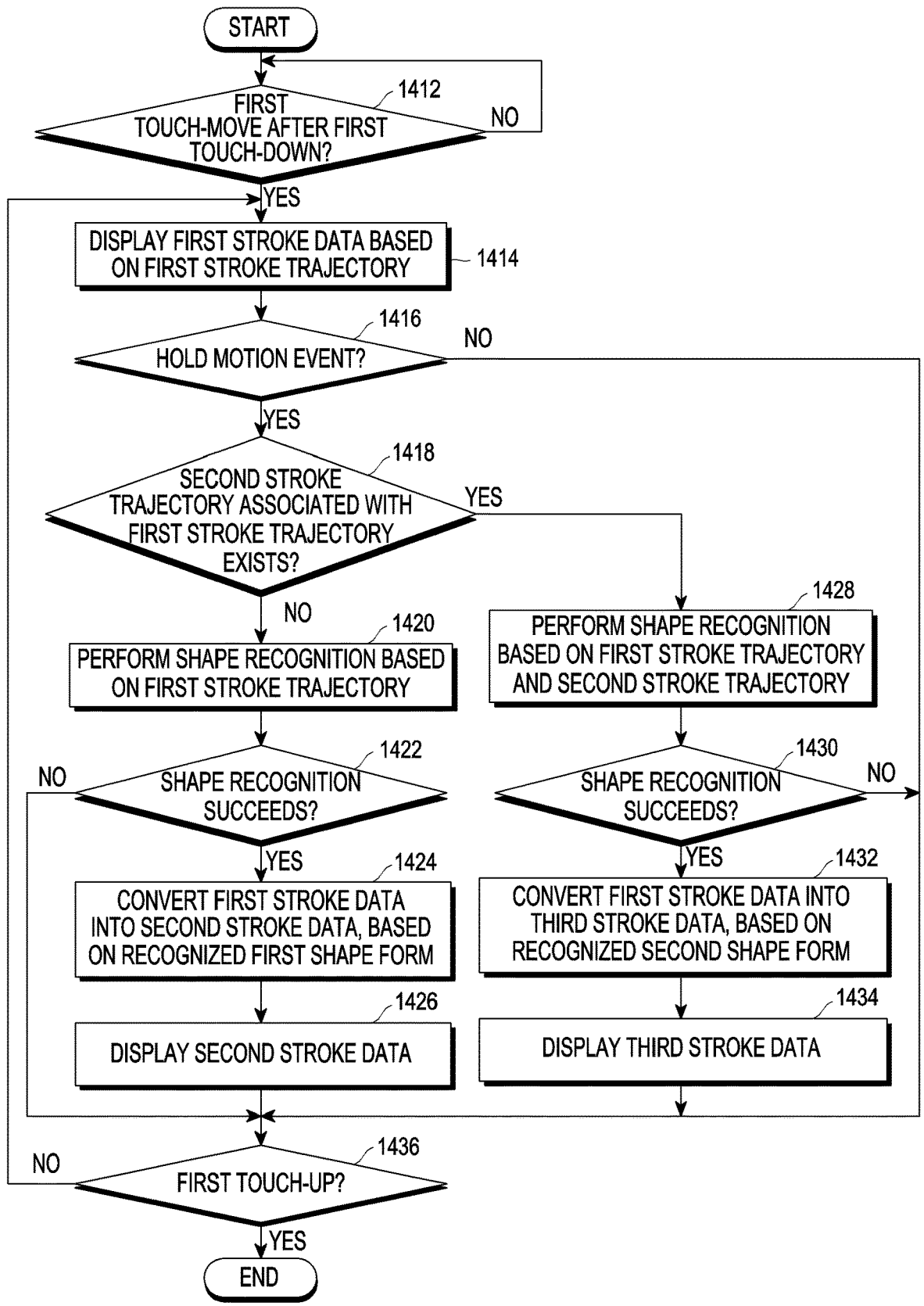
FIG. 14 is a flowchart illustrating a shape recognition operation based on a first stroke trajectory and a second stroke trajectory associated with the first stroke trajectory in an electronic device, according to an embodiment.

FIG. 14 is a flowchart illustrating a shape recognition operation based on a first stroke trajectory and a second stroke trajectory associated with the first stroke trajectory in an electronic device, according to an embodiment.

Referring to FIG. 14, a processor (e.g., the processor 120 of FIG. 1 or the processor 320 of FIG. 3A) of an electronic device (e.g., the electronic device 101 of FIG. 1 or the electronic device 301 of FIG. 3A) according to an embodiment may perform at least one of operations 1412 to 1436.

In operation 1412, the processor 320 according to an embodiment may determine whether a first touch-move (e.g., drawing) is input after a first touch-down. The processor 320 according to an embodiment may receive, from the sensing panel 361, a touch-down point in which the first touch-down is performed and touch points in a first specified time interval after the touch-down point, based on the input of the first touch-move (e.g., drawing) after the first touch-down.

In operation 1414, the processor 320 according to an embodiment may display first stroke data according to a first stroke trajectory. For example, the processor 320 may control to display, on the display panel 362, the first stroke data according to the first stroke trajectory based on the touch points received at the first specified time interval from the sensing panel 361. For example, the first stroke data according to the first stroke trajectory may be updated at the first specified time interval and displayed.

In operation 1416, the processor 320 according to an embodiment may determine whether a hold motion event has occurred. The processor 320 according to an embodiment may receive a touch point of the hold motion (e.g., when a touch is maintained in a predetermined area (e.g., 8 px×8 px) for a first specified time period) from the user from the sensing panel 361 during the display of the first stroke data according to the first stroke trajectory, and determine whether the hold motion event has occurred. According to an embodiment, when the hold motion event does not occur, the processor 320 may proceed to operation 1436.

In operation 1418, the processor 320 according to an embodiment may determine whether a second stroke trajectory associated with the first stroke trajectory exists, based on the occurrence of the hold motion event. For example, the second stroke trajectory associated with the first stroke trajectory may be a stroke trajectory pre-input within a specified time interval or a specified distance from the first stroke trajectory. The processor 320 according to an embodiment may proceed to operation 1420 when a stroke trajectory associated with the first stroke trajectory does not exist, and may proceed to operation 1436 when the second stroke trajectory associated with the first stroke trajectory exists.

In operation 1420, the processor 320 according to an embodiment may perform shape recognition on the first stroke data according to the first stroke trajectory. For example, the processor 320 may analyze the first stroke trajectory through the shape recognition module 324 to identify a shape form corresponding to the analysis. For example, the shape form may include various shape forms made of points and lines. For example, the shape form may include the shape of a closed curve such as a triangle, a rectangle, a circle, an ellipse, a trapezoid, or a star, or may include a straight line or a curved line.

In operation 1422, the processor 320 according to an embodiment may determine whether the shape recognition succeeds. The processor 320 according to an embodiment may proceed to operation 1436 when the shape recognition fails. The processor 320 according to an embodiment may identify a recognized shape form when the shape recognition succeeds.

In operation 1424, the processor 320 according to an embodiment may convert the first stroke data corresponding to the first stroke trajectory into second stroke data corresponding to the recognized shape form (e.g., first shape form). For example, the processor 320 may change the position of at least one point among a plurality of points included in the first stroke data so as to form the recognized shape form.

In operation 1426, the processor 320 according to an embodiment may display the second stroke data corresponding to the recognized first shape form. For example, the processor 320 may display the first stroke data and the second stroke data together, or display the second stroke data instead of the first stroke data. For example, the processor 320 may apply a pen drawing option (e.g., thickness of the pen, brush, color, or another option) of the second stroke data as a first pen drawing option applied to the first stroke data, and display the second stroke data to which the first pen drawing option is applied.

In operation 1428, the processor 320 according to an embodiment may perform shape recognition on the first stroke trajectory and the second stroke trajectory (e.g., a merged stroke trajectory in which the first stroke trajectory and the second stroke trajectory are merged). For example, the processor 320 may analyze the merged stroke trajectory through the shape recognition module 324 to identify a shape form (e.g., second shape form) corresponding to the analysis. For example, the shape form may include various shape forms made of points and lines. For example, the shape form may include the shape of a closed curve such as a triangle, a rectangle, a circle, an ellipse, a trapezoid, or a star, or may include a straight line or a curved line.

In operation 1430, the processor 320 according to an embodiment may determine whether the shape recognition succeeds. The processor 320 according to an embodiment may proceed to operation 1436 when the shape recognition fails. The processor 320 according to an embodiment may identify the recognized second shape form when the shape recognition succeeds.

In operation 1432, the processor 320 according to an embodiment may convert merged stroke data corresponding to the first stroke trajectory and the second stroke trajectory into third stroke data corresponding to the recognized second shape form. For example, the processor 320 may change the position of at least one point among a plurality of points included in the merged stroke data so as to form the recognized second shape form.

In operation 1434, the processor 320 according to an embodiment may display the third stroke data corresponding to the recognized second shape form. For example, the processor 320 may display the merged stroke data and the third stroke data together, or display the third stroke data instead of the merged stroke data. For example, the processor 320 may apply a pen drawing option (e.g., thickness of the pen, brush, color, or another option) of the third stroke data as a first pen drawing option applied to the merged stroke data, and display the third stroke data to which the first pen drawing option is applied.

In operation 1436, the processor 320 according to an embodiment may determine whether a first touch-up event has occurred. The processor 320 according to an embodiment may cancel (or stop) the display of the second stroke data or the third stroke data when the first touch-up event does not occur within a predetermined time period, and continue the operation of updating and displaying the first stroke data according to the first stroke trajectory in the first specified time interval. When the first touch-up event occurs, the processor 320 according to an embodiment may end the shape recognition operations while the second stroke data or the third stroke data is displayed.

According to an embodiment, a method for shape recognition based on a first stroke trajectory and a second stroke trajectory associated with the first stroke trajectory in an electronic device (e.g., the electronic device 101 of FIG. 1 or the electronic device 301 of FIG. 3a) may include, based on an input of a first touch-move after a first touch-down on a display (e.g., the display device 160 of FIG. 1 or the display device 360 of FIG. 3a) of the electronic device, displaying first stroke data of a first stroke trajectory on the display, determining whether a second stroke trajectory associated with the first stroke trajectory is stored in a memory, based on whether a hold motion event has occurred during the display of the first stroke data according to the first stroke trajectory, when a second stroke trajectory associated with the first stroke trajectory is stored in the memory, performing shape recognition on merged stroke data of the first stroke trajectory and the second stroke trajectory, converting the merged stroke data into third stroke data corresponding to a recognized shape form, based on the shape recognition for the merged stroke data, and displaying the third stroke data.

Figure 15:
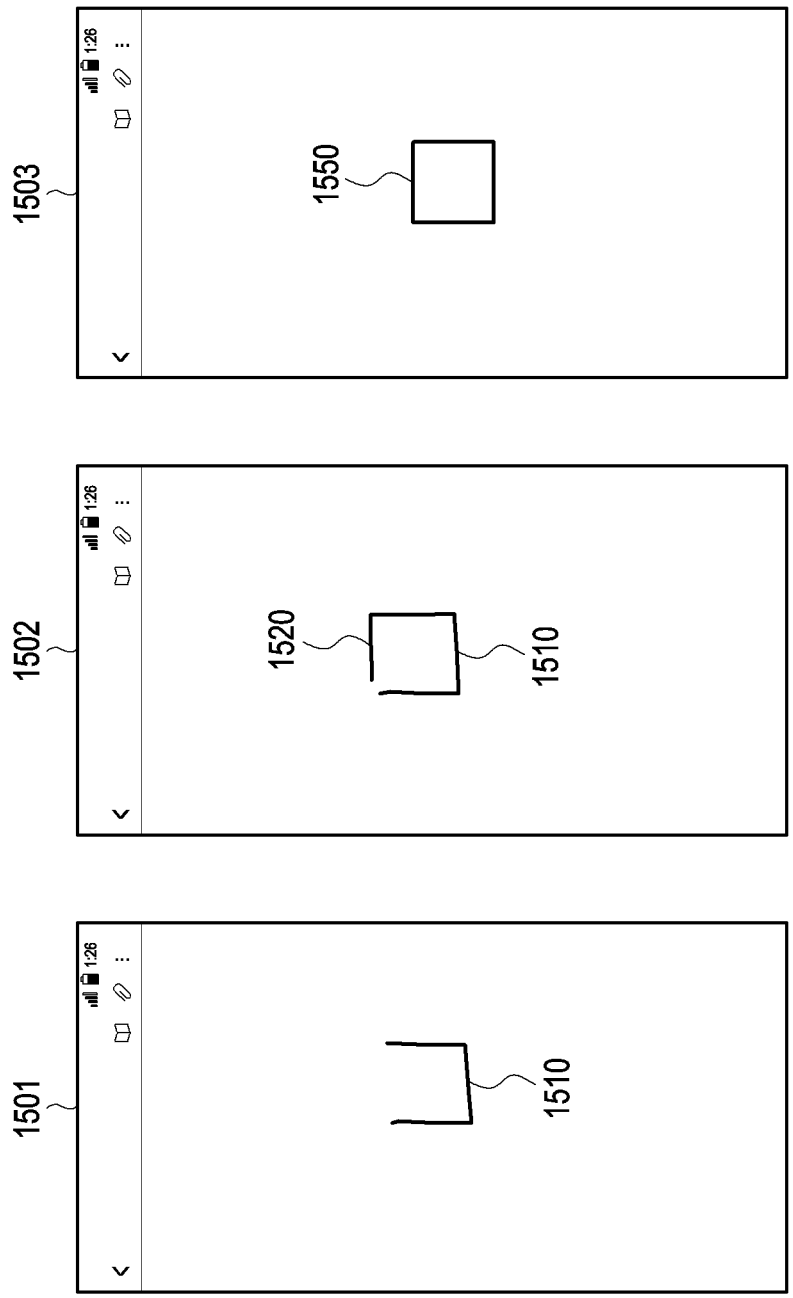
FIG. 15 illustrates screens in a case where an electronic device converts merged stroke data according to a second stroke trajectory associated with a first stroke trajectory into third stroke data and display the third stroke data, according to an embodiment.

FIG. 15 illustrates screens in a case where an electronic device converts merged stroke data according to a second stroke trajectory associated with a first stroke trajectory into third stroke data and display the third stroke data, according to an embodiment.

Referring to FIG. 15, the processor 320 according to an embodiment may display stroke data 1510 as shown in a first screen 1501 and then display first stroke data 1520 corresponding to a first stroke trajectory as shown in a second screen 1502. The processor 320 according to an embodiment may identify the existence of the stroke data 1510 associated with the first stroke data 1520, based on a hold motion input (a shape recognition trigger) during the display of the first stroke data 1520. The processor 320 according to an embodiment may perform shape recognition on merged stroke data of the first stroke data 1520 and the stroke data 1510, based on the identification of the existence of the stroke data 1510 associated with the first stroke data 1520. The processor 320 according to an embodiment may display third stroke data 1550 corresponding to the merged stroke data as shown in a third screen 1503, based on success of the shape recognition on the merged stroke data.

Figure 16:
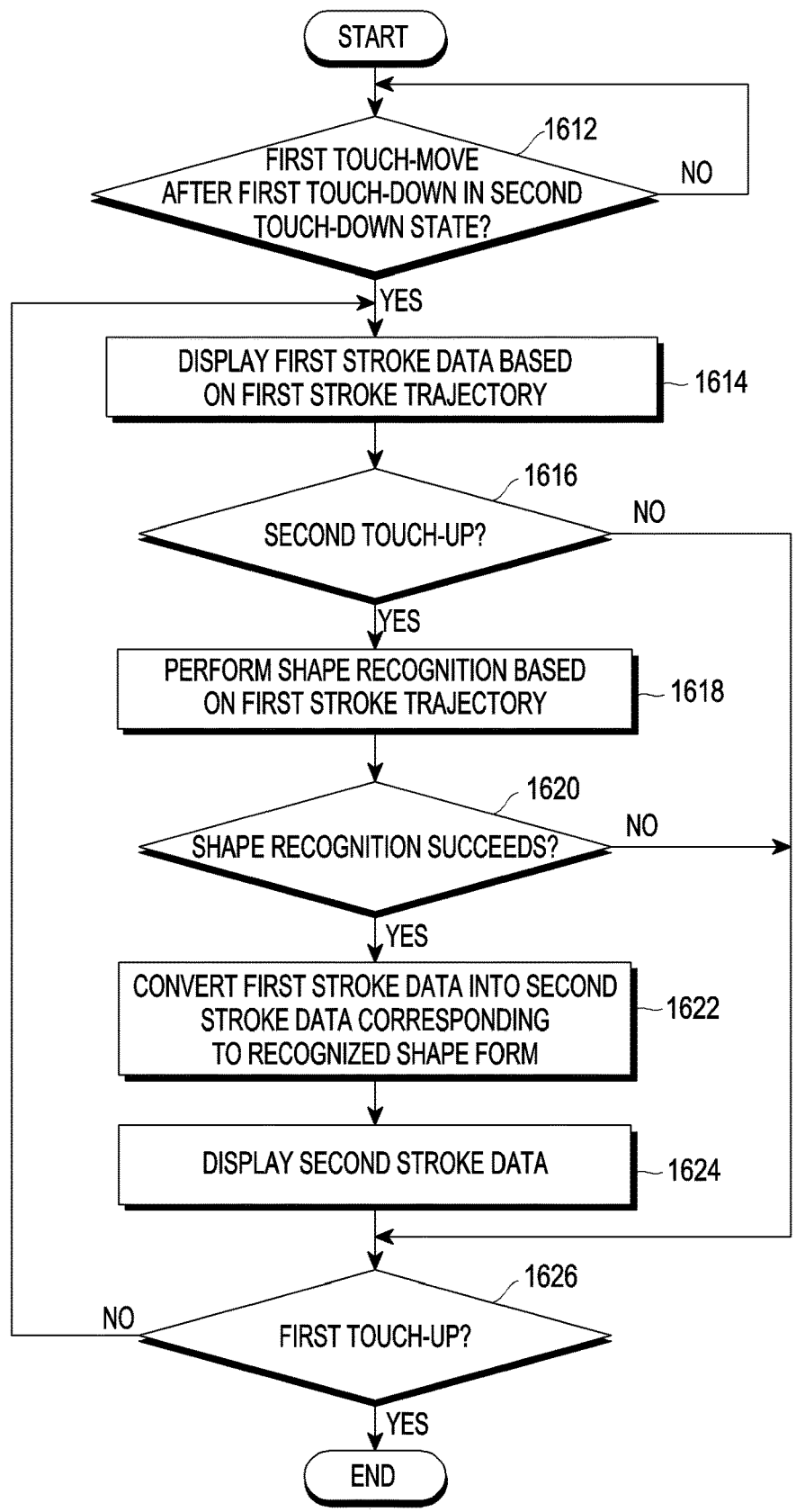
FIG. 16 is a flowchart illustrating a shape recognition operation when a second touch-up occurs while a first stroke trajectory by a first touch-move is in progress after a first touch-down in a second touch-down state in an electronic device, according to an embodiment.

FIG. 16 is a flowchart illustrating a shape recognition operation when a second touch-up occurs while a first stroke trajectory by a first touch-move is in progress after a first touch-down in a second touch-down state in an electronic device, according to an embodiment.

Referring to FIG. 16, a processor (e.g., the processor 120 of FIG. 1 or the processor 320 of FIG. 3A) of an electronic device (e.g., the electronic device 101 of FIG. 1 or the electronic device 301 of FIG. 3A) according to an embodiment may perform at least one of operations 1612 to 1626.

In operation 1612, the processor 320 according to an embodiment may determine whether a first touch-move (e.g., drawing) is input after a first touch-down in a second touch-down state. According to another embodiment, based on the input of the first touch-move (e.g., drawing) after the first touch-down, a second touch-down may be identified while touch points are received from the sensing panel 361 in a first specified time interval from the first touch-down point. For example, the input of the first touch-move after the first touch-down in the second touch-down state may be an input in the case where the user draws by using the stylus pen 201 while touching the display device 360 with a finger. The processor 320 according to an embodiment may receive, from the sensing panel 361, a second touch-down point, a touch-down point in which the first touch-down is performed, and touch points in the first specified time interval after the first touch-down point, based on the input of the first touch-move after the first touch-down in the second touch-down state.

In operation 1614, the processor 320 according to an embodiment may display first stroke data according to a first stroke trajectory. For example, the processor 320 may control to display, on the display panel 362, the first stroke data according to the first stroke trajectory based on the touch points received at the first specified time interval from the sensing panel 361. For example, the first stroke data according to the first stroke trajectory may be updated at the first specified time interval and displayed.

In operation 1616, the processor 320 according to an embodiment may determine whether a second touch-up is performed. The processor 320 according to an embodiment may determine whether the second touch-up is performed during the display of the first stroke data according to the first stroke trajectory. For example, the second touch-up may be identified when the user releases the finger touch while drawing with the stylus pen 201 when the user was previously touching the display device 360 with her finger. According to an embodiment, when the second touch-up event does not occur, the processor 320 may proceed to operation 1626. The processor 320 according to an embodiment may generate a shape recognition trigger, based on the occurrence of the second touch-up event. According to another embodiment, when a first touch-up occurs while the second touch-down is maintained, the processor 320 may generate a shape recognition trigger.

In operation 1618, the processor 320 according to an embodiment may perform shape recognition on the first stroke data according to the first stroke trajectory, based on the occurrence of the second touch-up event. For example, the processor 320 may analyze the first stroke trajectory through the shape recognition module 324 to identify a shape form corresponding to the analysis. For example, the shape form may include various shape forms made of points and lines. For example, the shape form may include the shape of a closed curve such as a triangle, a rectangle, a circle, an ellipse, a trapezoid, or a star, or may include a straight line or a curved line.

In operation 1620, the processor 320 according to an embodiment may determine whether the shape recognition succeeds. The processor 320 according to an embodiment may proceed to operation 1626 when the shape recognition fails. The processor 320 according to an embodiment may identify a recognized shape form when the shape recognition succeeds.

In operation 1622, the processor 320 according to an embodiment may convert the first stroke data corresponding to the first stroke trajectory into second stroke data corresponding to the recognized shape form. For example, the processor 320 may change the position of at least one point among a plurality of points included in the first stroke data so as to form the recognized shape form.

In operation 1624, the processor 320 according to an embodiment may display the second stroke data corresponding to the recognized shape form. For example, the processor 320 may display the first stroke data and the second stroke data together, or display the second stroke data instead of the first stroke data. For example, the processor 320 may apply a pen drawing option (e.g., thickness of the pen, brush type, color, or another option) of the second stroke data as a first pen drawing option applied to the first stroke data, and display the second stroke data to which the first pen drawing option is applied.

In operation 1626, the processor 320 according to an embodiment may determine whether a first touch-up event has occurred. The processor 320 according to an embodiment may cancel (or stop) the display of the second stroke data when the first touch-up event does not occur in a predetermined period, and continue the operation of updating and displaying the first stroke data according to the first stroke trajectory at the first specified time interval. The processor 320 according to an embodiment may end the shape recognition operations while the second stroke data is displayed when the first touch-up event occurs.

According to an embodiment, a method for shape recognition when a second touch-up occurs while a first stroke trajectory by a first touch-move is in progress after a first touch-down in a second touch-down state in an electronic device (e.g., the electronic device 101 of FIG. 1 or the electronic device 301 of FIG. 3a) may include, based on an input of a first touch-move after a first touch-down on a display (e.g., the display device 160 of FIG. 1 or the display device 360 of FIG. 3a) of the electronic device, displaying first stroke data of a first stroke trajectory on the display, identifying a second touch-down during the display of the first stroke data of the first stroke trajectory, performing shape recognition on the first stroke trajectory, based on occurrence of a second touch-up for the second touch-down, converting the first stroke data into second stroke data corresponding to a recognized shape form, based on the shape recognition, and displaying the second stroke data on the display.

Figure 17:
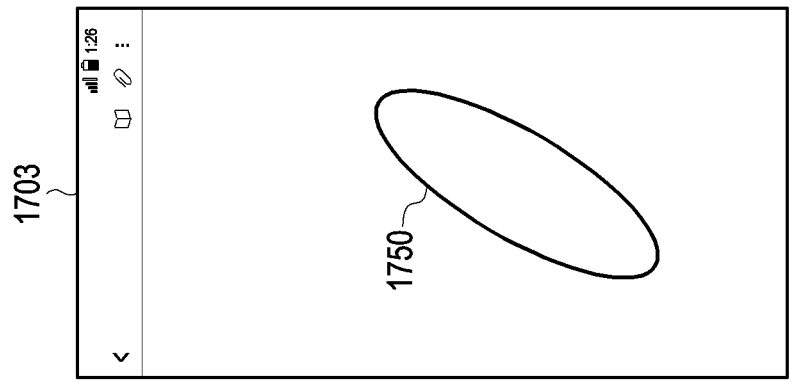
FIG. 17 illustrates screens displayed in an electronic device when a second touch-up occurs while a first stroke trajectory by a first touch-move is in progress after a first touch-down in a second touch-down state, according to an embodiment.
Figure 17:
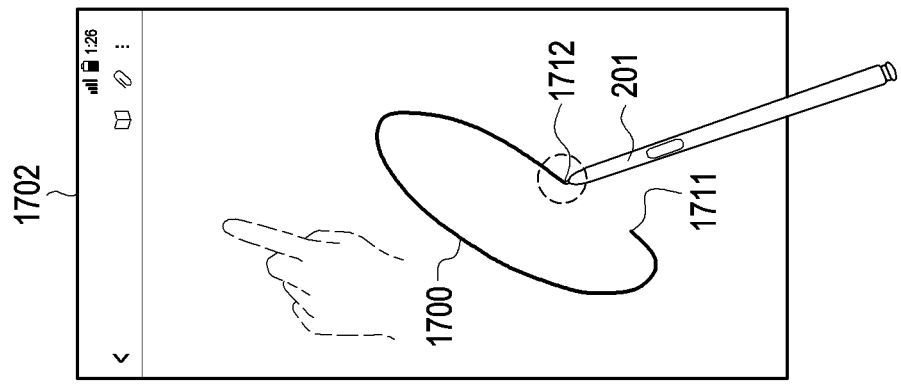
Figure 17:
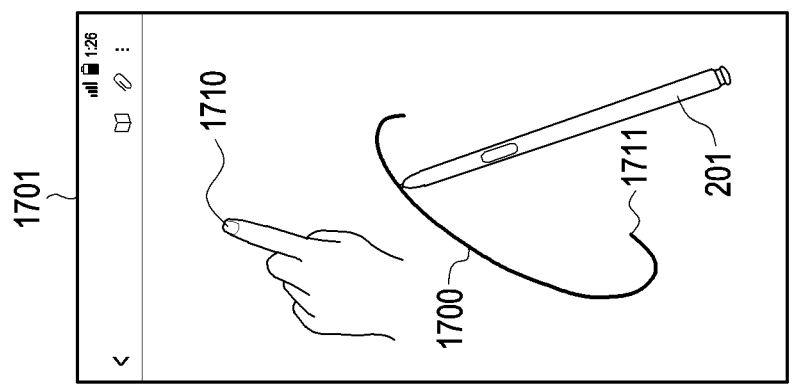

FIG. 17 illustrates screens displayed in an electronic device when a second touch-up occurs while a first stroke trajectory by a first touch-move is in progress after a first touch-down in a second touch-down state, according to an embodiment.

Referring to FIG. 17, the processor 320 according to an embodiment may display first stroke data 1700 corresponding to a first stroke trajectory starting from a first touch-down point 1711 by the stylus pen 201 while a second touch-down 1710 is performed by a finger as shown in a first screen 1701.

The processor 320 according to an embodiment may perform shape recognition on the first stroke data 1700 corresponding to the first stroke trajectory (a trajectory from 1711 to 1712) at the time point of a second touch-up, when the second touch-down 1710 by the finger is changed to the second touch-up during the display of the first stroke data 1700 corresponding to the first stroke trajectory as shown in a second screen 1702. That is, the processor 320 may perform shape recognition when the finger is lifted from the touch panel. The processor 320 according to an embodiment may obtain second stroke data 1750 corresponding to a recognized shape form when the shape recognition succeeds.

The processor 320 according to an embodiment may display the obtained second stroke data 1750 as shown in a third screen 1703.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment, provided is a non-transitory storage medium storing commands configured to, when executed by at least one processor, cause the at least one processor to perform at least one operation, wherein the at least one operation may include based on an input of a first touch-move after a first touch-down on a display of an electronic device, displaying first stroke data of a first stroke trajectory on the display, performing shape recognition on the first stroke trajectory, based on a size of the first stroke trajectory and a distance between a stroke start point of the first stroke trajectory and another point on the first stroke trajectory, converting the first stroke data into second stroke data corresponding to a recognized shape form, based on the shape recognition, and displaying the second stroke data on the display.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

In addition, the embodiments of the disclosure disclosed in the specification and drawings are provided only to provide a specific example in order to easily describe the technical content according to an embodiment of the disclosure and to help understanding of the embodiment of the disclosure, and are not intended to limit the scope of the embodiments of the disclosure. Therefore, the scope of various embodiments of the disclosure should be interpreted to include all changes or modified forms derived based on the technical idea of the various embodiments of the disclosure in addition to the embodiments disclosed herein.

What is claimed is:

1. An electronic device comprising:
a display;
a memory; and
at least one processor operatively coupled to the display and the memory,
wherein the memory stores instructions that are configured to, when executed, cause the at least one processor to:
identify a size of a first stroke trajectory and a distance between a stroke start point of the first stroke trajectory and each one of points following the stroke start point on the first stroke trajectory at designated time intervals while displaying first stroke data of the first stroke trajectory, based on an input of a first touch-move without a first touch-up after a first touch-down on the display,
determine whether the size of the first stroke trajectory is greater than a specified size and a first distance between the stroke start point and a point among the points is less than a second distance between the stroke start point and a previous point of the point among the points,
responsive to the determination, perform shape recognition for the first stroke trajectory,
obtain second stroke data corresponding to a recognized shape about the first stroke data based on the shape recognition, and
display the second stroke data on the display,
wherein the second stroke data includes a first shape recognized by using the first stroke trajectory, and the first shape is one of a triangle shape, a rectangle shape, a circle shape, an ellipse shape, a trapezoid shape, a star shape, a straight line, or a curved line.

2. The electronic device of claim 1, wherein the instructions are further configured to, when executed, cause the at least one processor to stop displaying the second stroke data when the input of the first touch-move is continued without the first touch-up for the first touch-down after displaying the second stroke data.

3. The electronic device of claim 1, wherein the instructions are further configured to, when executed, cause the at least one processor to stop displaying the first stroke data and display the second stroke data.

4. The electronic device of claim 1, wherein the instructions are further configured to, when executed, cause the at least one processor to display the second stroke data together with the first stroke data.

5. The electronic device of claim 1, wherein the instructions are further configured to, when executed, cause the at least one processor to identify a first pen drawing option corresponding to the first stroke data, and apply the first pen drawing option to the second stroke data to display the second stroke data.

6. The electronic device of claim 1, wherein the instructions are further configured to, when executed, enable the at least one processor to perform the shape recognition on the first stroke trajectory, based cause whether a hold motion event has occurred while displaying the first stroke data of the first stroke trajectory.

7. The electronic device of claim 1, wherein the instructions are further configured to, when executed, cause the at least one processor to:
identify whether a second stroke trajectory associated with the first stroke trajectory is stored in the memory, based on whether a hold motion event has occurred while displaying the first stroke data of the first stroke trajectory,
when the second stroke trajectory associated with the first stroke trajectory is stored in the memory, perform shape recognition on merged stroke data of the first stroke trajectory and the second stroke trajectory,
convert the merged stroke data into third stroke data corresponding to another recognized shape form, based on the shape recognition on the merged stroke data, and display the third stroke data on the display.

8. The electronic device of claim 1, wherein the instructions are further configured to, when executed, cause the at least one processor to identify a second touch-down while displaying the first stroke data of the first stroke trajectory on the display, and perform the shape recognition on the first stroke trajectory, based on occurrence of a second touch-up for the second touch-down.

9. The electronic device of claim 8, wherein the first touch-down and the first touch-move are inputs by a stylus pen, and the second touch-down is an input by a user's finger.

10. A method for shape recognition based on stroke analysis in an electronic device, the method comprising:
identifying a size of a first stroke trajectory and a distance between a stroke start point of the first stroke trajectory and each one of points following the stroke start point on the first stroke trajectory at designated time intervals while displaying first stroke data of the first stroke trajectory on a display of the electronic device, based on an input of a first touch-move without a first touch-up after a first touch-down on the display;
determining whether the size of the first stroke trajectory is greater than a specified size and a first distance between the stroke start point and a point among the points is less than a second distance between the stroke start point and a previous point of the point among the points;
responsive to the determination, performing shape recognition for the first stroke trajectory;
obtaining second stroke data corresponding to a recognized shape about the first stroke data, based on the shape recognition; and
displaying the second stroke data on the display,
wherein the second stroke data includes a first shape recognized by using the first stroke trajectory, and the first shape is one of a triangle shape, a rectangle shape, a circle shape, an ellipse shape, a trapezoid shape, a star shape, a straight line, or a curved line.

11. The method of claim 10, wherein the displaying of the second stroke data is stopped when the input of the first touch-move is continued without the first touch-up for the first touch-down after displaying the second stroke data.

12. The method of claim 10, wherein the displaying of the first stroke data is stopped and the second stroke data is displayed.

13. The method of claim 10, wherein the second stroke data is displayed together with the first stroke data.

14. The method of claim 10, wherein a first pen drawing option corresponding to the first stroke data is identified, and the first pen drawing option is applied to the second stroke data to display the second stroke data.

15. A non-transitory storage medium storing commands configured to, when executed by at least one processor, cause the at least one processor to perform at least one operation, the at least one operation comprising:
identifying a size of a first stroke trajectory and a distance between a stroke start point of the first stroke trajectory and each one of points following the starting point on the first stroke trajectory at designated time intervals while displaying first stroke data of the first stroke trajectory on a display of an electronic device, based on an input of a first touch-move without a first touch-up after a first touch-down on the display;
determining whether the size of the first stroke trajectory is greater than a specified size and a first distance between the stroke start point and a point among the points is less than a second distance between the stroke start point and a previous point of the point among the points;
responsive to the determination, performing shape recognition for the first stroke trajectory;
obtaining second stroke data corresponding to a recognized shape about the first stroke data, based on the shape recognition; and
displaying the second stroke data on the display,
wherein the second stroke data includes a first shape recognized by using the first stroke trajectory, and the first shape is one of a triangle shape, a rectangle shape, a circle shape, an ellipse shape, a trapezoid shape, a star shape, a straight line, or a curved line.

16. The non-transitory storage medium of claim 15, wherein the at least one operation further comprises stopping displaying the second stroke data when the first touch-up is not performed after displaying the second stroke data and the input of the first touch-move is continued.

17. The non-transitory storage medium of claim 15, wherein the at least one operation further comprises identifying a first pen drawing option corresponding to the first stroke data, and applying the first pen drawing option to the second stroke data to display the second stroke data.

* * * * *